US012571666B2

(12) United States Patent
Ferry

(10) Patent No.: US 12,571,666 B2
(45) Date of Patent: Mar. 10, 2026

(54) SYSTEM AND METHOD FOR EARLY WARNING OF SOLIDS PLUGGAGE IN GAS-SOLID MULTI-PHASE FLOW THROUGH TRANSPORT PIPE

(71) Applicant: GE Infrastructure Technology LLC, Greenville, SC (US)

(72) Inventor: Allan Gunn Ferry, Windsor, CT (US)

(73) Assignee: GE Infrastructure Technology LLC, Greenville, SC (US)

( * ) Notice: Subject to any disclaimer, the term of this patent is extended or adjusted under 35 U.S.C. 154(b) by 365 days.

(21) Appl. No.: 18/521,270

(22) Filed: Nov. 28, 2023

(65) Prior Publication Data

US 2025/0172424 A1 May 29, 2025

(51) Int. Cl.
*G01F 1/74* (2006.01)
*F17D 3/01* (2006.01)
*G01F 1/663* (2022.01)

(52) U.S. Cl.
CPC ................. *G01F 1/74* (2013.01); *F17D 3/01* (2013.01); *G01F 1/663* (2013.01)

(58) Field of Classification Search
CPC ............... G01F 1/74; G01F 1/663; F17D 3/01
USPC ....................................................... 73/23.33
See application file for complete search history.

(56) References Cited

U.S. PATENT DOCUMENTS

| | | | | |
|---|---|---|---|---|
| 5,571,974 | A | * | 11/1996 | Nauful ...................... G01F 1/74 |
| | | | | 73/861.73 |
| 7,673,525 | B2 | | 3/2010 | Huang |
| 10,067,292 | B2 | | 9/2018 | Boguszewski et al. |
| 10,088,157 | B2 | | 10/2018 | Sutton et al. |
| 10,350,607 | B2 | | 7/2019 | Sutton et al. |
| 10,865,985 | B2 | | 12/2020 | Yang et al. |
| 2012/0292523 | A1 | | 11/2012 | George et al. |
| 2016/0209031 | A1 | | 7/2016 | Lou et al. |
| 2018/0180280 | A1 | | 6/2018 | Neuschaefer et al. |
| 2018/0306441 | A1 | | 10/2018 | Bozzuto et al. |
| 2025/0172424 | A1 | * | 5/2025 | Ferry ...................... G01F 1/663 |

FOREIGN PATENT DOCUMENTS

| | | |
|---|---|---|
| CA | 2729318 A1 | 1/2010 |
| CN | 206848192 | 1/2018 |
| CN | 215440518 | 1/2022 |

* cited by examiner

*Primary Examiner* — Peter J Macchiarolo
*Assistant Examiner* — Rodney T Frank
(74) *Attorney, Agent, or Firm* — Grogan, Tuccillo & Vanderleeden, LLP

(57) ABSTRACT

A system and method for early warning of solids pluggage in a gas-solid multi-phase flow through transport pipe. At least one doppler radar-based mass flow sensor measures reflections of signals from solid particles that are carried in a gas transport stream by the transport pipe from a solid particles feed source to a solid particles processing location. A controller detects conditions in the gas transport stream carrying the solid particles in the transport pipe that are representative of an early warning of pluggage of solid particles in the pipe as a function of information provided by the at least one doppler radar-based mass flow sensor.

20 Claims, 8 Drawing Sheets

FROM
FORCED-
DRAFT FAN

TO STACK

Raw Coal

Feed Regulator

SYSTEM AND METHOD FOR EARLY WARNING OF SOLIDS PLUGGAGE IN GAS-SOLID MULTI-PHASE FLOW THROUGH TRANSPORT PIPE

STATEMENT REGARDING FEDERALLY SPONSORED RESEARCH OR DEVELOPMENT

This invention was made with government support under agreement DE-FE0031546 awarded by the U.S. Department of Energy. The U.S. government has certain rights in the invention.

BACKGROUND

Technical Field

Embodiments of this disclosure relate generally to pneumatic transport of solid particles from one location to another location, and more particularly, to a system and method for detecting early warning of solids pluggage in a transport pipe, duct, tube or conduit used to supply solid particles in a gas transport stream from a solid particles feed source location to a solid particles processing location.

DISCUSSION OF ART

Pneumatic transport of solid particles in a gas transport stream is used in many industries to transport solids from one location to another location. A combustion system that includes a boiler with a furnace to burn fuel and create thermal energy or heat is one example in which pneumatic transport can be used to transport solid particles in a gas transport stream. The fuel, which can be pulverized solid fuel such as coal, is typically provided to the boiler from a pulverizer by a fuel transport pipe in a stream of gas (e.g., air, or air mixed with other gases). Burners located on one or more walls of the boiler such as at the corners in the case of a tangentially-fired (T-fired) boiler or on a single or opposing walls in the case of a wall-fired boiler, introduce a mix of the fuel and gas carried by the fuel transport pipe into the furnace for combustion and generation of a flame. The flame resulting from the combustion of the pulverized fuel and gas creates the thermal energy. The thermal energy is used to heat a liquid or vapor such as water or steam in waterwall tubes that line the walls of the furnace. The heating of the liquid or vapor in the waterwall tubes leads to the generation of a steam which can be made to flow to a steam turbine to generate electricity or provide heat for other purposes.

Coal-fired boilers for steam generation can utilize one or more pulverizers to mill or pulverize raw coal to a desired fineness at a particular throughput. Each pulverizer can have a number of fuel transport pipes that supply the pulverized coal in a gas transport stream to multiple burners located on each of the corners of the boiler in the case of a T-fired boiler, or on a single or opposing walls in the case of a wall-fired boiler. Depending on the location of the pulverizer with respect to the boiler, the fuel transport pipes can be configured with a number of horizontal sections that extend to the boiler at an elevation level that is relatively closer to ground level in comparison to the burners which are at a substantially higher elevation level. For example, if the pulverizer is placed on one side of the boiler, then some fuel transport pipes can have short runs of horizontal sections to the corners or walls of the boiler that are closest to the pulverizer, while corners or walls on the boiler that are further away from the pulverizer can have additional longer runs of horizontal sections. Since the burners are typically disposed on the corners or walls of the boiler at a substantially higher elevation than the elevation level of the horizontal sections, the fuel transport pipes can have long runs of vertical sections extending upward from the horizontal sections typically via connecting elbow sections placed therebetween.

Depending on the size, weight and density of the particles of the pulverized coal, a minimum gas stream velocity is needed to carry the particles in the fuel transport pipes from the pulverizer to the burners of the boiler. Otherwise, particles of the pulverized coal can fall out from the gas transport stream and accumulate in the fuel transport pipes if their velocity is insufficient to maintain forward motion. Maintaining a minimum gas stream velocity in fuel transport pipes becomes more of a challenge as some power plant operators that use coal-fired boilers for steam generation have transitioned from standard diameter-sized fuel transport pipes to larger diameter-sized fuel transport pipes to better accommodate pulverized coal particles that are harder and more erosive due to higher content of silica, sand and other abrasive material. Although pulverized coal can fall out from the gas transport stream and accumulate in standard diameter-sized fuel transport pipes under certain conditions that can stem from lower gas stream velocities to poor performance of a pulverizer with respect to grinding and pulverizing the raw coal, the fallout of coal from the gas transport stream is more likely to occur with larger diameter-sized fuel transport pipes. In particular, the use of these larger diameter-sized fuel transport pipes tend to result in gas streams with slower velocities, which increases the likelihood that there will be more particles of the pulverized coal that fall out from the gas transport stream and accumulate in the fuel transport pipes. The falling out of the particles of the pulverized coal can occur in both the horizontal and vertical sections of the fuel transport pipes, but this effect can be more prominent in sections of the pipes that are near the transitions between the horizontal and vertical sections above the connecting elbow sections. More particles of the pulverized coal can fall out of the gas stream just above the elbow sections because the velocity of the gas transport stream can be at its lowest due to the transition in the pipes from the horizontal sections to the vertical sections, and the edges of the pipes at these sections can put a drag on the flow just as the gas stream is trying push the fuel particles upward against gravity to reach the elevated burners. The gas transport stream at a lower velocity and the edges of the pipes putting a drag on the gas stream, all while going against gravity, are conditions that can cause the coal particles to fall backwards in a reverse direction in relation to the normal flow path in these sections of the fuel transport pipes, and consequently accumulate in the fuel transport pipes.

Particles of pulverized coal that have fallen out from the gas transport stream and accumulated in the fuel transport pipes can cause several problems regardless of whether the falling out and accumulation of particles occurs in the horizontal or vertical sections of the pipes. For example, the ratio of air-to-fuel that is supplied to the burners can change from a planned value that has been specified to attain optimum performance of the coal boiler due to the "lost" solid fuel (i.e., the coal particles that have fallen out from the gas transport stream). In particular, if coal particles fall out from the gas transport stream in one of the fuel transport pipes and accumulate over a period of time such that pluggage of the pipe occurs, then the particles will eventually block both gas and fuel flow completely in that pipe. Consequently, the fuel and gas in the gas transport stream will divert to the other burners, causing an overall change in the ratio of air-to-fuel in the boiler, that can have an effect on the performance of the boiler.

In addition to changes in the ratio of air-to-fuel in the boiler, solid fuel particles that have accumulated in the fuel transport pipes may catch fire in the pipes, causing damage to the pipes and placing nearby personnel in significant danger. Further, fires in the fuel transport pipes can have significant economic ramifications to power plant operators. For example, if there is a bad fire, then that can lead to lost days and weeks of production (i.e., electricity generation, or other industrial processes using steam from the boiler) and capacity at millions of dollars a day if the boiler has to undergo a shutdown. If the boiler is shut down, it may become necessary for the power plant operators to buy replacement power on a spot market and that can be very costly especially if the shutdown occurs during periods of high demand. Adding these costs with the expenses associated with performing maintenance to repair the boiler makes a compelling reason why power plant operators have a desire to monitor the accumulation of coal particles that have fallen out from a gas transport stream and deposited in the fuel transport pipes, so that a corrective action can be taken early enough before there are ample particles to bring about a fire.

Existing measurement technologies in a typical solid fuel-fired boiler such as a coal-fired boiler that have been used to detect fuel transport pipe fires include thermocouples or other temperature measuring sensors placed at various locations about the pipes. However, measurement devices of this sort are often insufficient to detect pluggage, blockage, or obstruction of a fuel transport pipe with solid particles of fuel that have fallen from a gas transport stream before such conditions become severe enough to lead to an imminent fire.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

Embodiments described herein provide, in general, a solution for detecting early warning of pluggage in a transport pipe, duct, tube or conduit used to supply solid particles in a gas transport stream from a solid particles feed source location to a solid particles processing location, and in particular, a solution to the inadequacies of the aforementioned measurement technologies that rely on thermocouples or other temperature measuring sensors to detect fuel transport pipe fires, such as their inability to identify pluggage, blockage, or obstruction of a fuel transport pipe with solid particles of fuel that have fallen out from a gas transport stream at an early stage as particles accumulate in the pipe. The solution of the various embodiments includes using primary and secondary measurement information from one or more sensors and combining indications from the sensors to provide a more reliable early warning of potential solids pluggage in a transport pipe. One of the sensors can include at least one doppler radar-based mass flow sensor that emits microwave signals towards the gas transport stream carrying the solid particles in the transport pipe and measures reflections from the solid particles, while the other sensor can include at least one particle velocity sensor such as for example, a triboelectric velocity sensor and/or an image processing-based velocity sensor that can measure the velocity of the solid particles and provide one or more qualitative indications associated with the velocity measurements of the solid particles.

In the various embodiments, a controller is operative to detect conditions in the gas transport stream carrying the solid particles in the transport pipe that are representative of an early warning of pluggage of solid particles in the transport pipe as a function of information provided by one or more of the at least one doppler radar-based mass flow sensor and the at least one solid particle velocity sensor. The controller can utilize a solid particles pluggage detection algorithm and/or an empirical-based solid particles pluggage detection model to correlate the information provided by the at least one doppler radar-based mass flow sensor and/or the at least one particle velocity sensor.

In one embodiment, the correlation of the information from the at least one doppler radar-based mass flow sensor can include comparing the measured reflections to an expected solid particles flow value derived from a flow of the solid particles moving into the solid particles feed source. The comparison of the measured reflections to the expected solid particles flow value provides an understanding of the measured reflections that are attributable to the reflections from the solid particles in the gas transport stream and not reflections that are attributed to turbulence in the gas transport stream that can lead to false measurement readings by the at least one doppler radar-based mass flow sensor.

In one embodiment, the correlation of the information from the at least one solid particle velocity sensor can include evaluating the velocity measurements of the solid particles and the one or more qualitative indications for trends of changing behavior in the measurements. For example, the correlation of the information from the one or more solid particle velocity sensors can include evaluating the velocity measurements for trends in instances that the velocity measurements are below a predetermined minimum velocity threshold, and evaluating the one or more qualitative indications for trends in instances that the one or more qualitative indications are suggestive of conditions corresponding to pluggage of solid particles in the transport pipe.

If the correlation of information from either the at least one doppler radar-based mass flow sensor or the at least one solid particle velocity sensor is an indicative of a pluggage of solid particles in the transport pipe, then a warning can be generated to a plant operator. If the correlation of information from both the at least one doppler radar-based mass flow sensor and the at least one solid particle velocity sensor are indicative of a pluggage of solid particles in the transport pipe, then a more severe warning can be generated for the plant operator.

By having early detection of solid particles falling out of their transport gas stream, any of a number of corrective actions can be taken, including making recommendation and taking direct action. For example, in an embodiment that pertains to a combustion system that supplies pulverized solid particles of fuel in a gas transport stream from a solid fuel feed source to a boiler for combustion via a fuel transport pipe, power plant operators can take early actions to avoid a larger problem. In particular, the velocity of the transport gas may be increased until solid particles of fuel no longer fall out of the transport gas stream. Maintenance may then be deferred until a more convenient time, or maintenance may not be necessary as higher transport gas velocities may allow the gas transport stream to pick up solid particles of fuel that have fallen into the fuel transport pipe and transport them to the burners. Further, early warning of flammable particles collecting in the fuel transport pipe can be used to prevent those flammable particles from catching fire in an unplanned location. If process changes are insufficient to stop particles from falling out of their transport gas stream, then the power plant operators can plan for an orderly process shutdown of the boiler to clear the fallen fuel particles and resolve any other process or equipment issues that caused the original problem.

In accordance with a first embodiment, a system is provided. The system of this embodiment comprises: a solid particles feed source; a solid particles processing location; a transport pipe to transport a supply of the solid particles from the solid particles feed source in a gas transport stream to the solid particles processing location; at least one doppler radar-based mass flow sensor operatively coupled to the transport pipe to emit microwave signals towards the gas transport stream carrying the solid particles in the transport pipe and measure reflections of the microwave signals from the solid particles in the gas transport stream, the measured reflections including reflections from the solid particles and turbulence in the gas transport stream, wherein the measured reflections from the solid particles and the turbulence in the gas transport stream provide an indication of the flow of the solid particles in the transport pipe; and a controller operative to detect conditions in the gas transport stream carrying the solid particles in the transport pipe that are representative of pluggage of solid particles in the transport pipe as a function of information provided by the at least one doppler radar-based mass flow sensor, wherein the controller is configured to correlate the information provided by the at least one doppler radar-based mass flow sensor with conditions that are indicative of pluggage in the transport pipe based on solid particles that have fallen out of the gas transport stream and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

In accordance with a second embodiment, a method for detecting pluggage in a transport pipe that supplies solid particles in a gas transport stream from a solid particles feed source to a solid particles processing location. The method of this embodiment comprises: emitting microwave signals toward the gas transport stream carrying the solid particles in the transport pipe with at least one doppler radar-based mass flow sensor; measuring reflections of the microwave signals from the solid particles in the gas transport stream with the at least one doppler radar-based mass flow sensor, the measured reflections including reflections from the solid particles and turbulence in the gas transport stream, wherein the measured reflections from the solid particles and the turbulence in the gas transport stream provide an indication of the flow of the solid particles in the transport pipe; and detecting conditions in the gas transport stream carrying the solid particles in the transport pipe that are representative of pluggage of solid particles in the transport pipe as a function of information provided by the at least one doppler radar-based mass flow sensor, wherein the detecting comprises correlating the information provided by the at least one doppler radar-based mass flow sensor with conditions that are indicative of pluggage in the transport pipe based on solid particles that have fallen out of the gas transport stream carrying the particles and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

In accordance with a third embodiment, a system is provided. The system of this embodiment comprises: a solid particles feed source; a solid particles processing location; a transport pipe to transport a supply of the solid particles from the solid particles feed source in a gas transport stream to the solid particles processing location; at least one solid particle velocity sensor operatively coupled to the transport pipe to obtain velocity measurements of the solid particles and provide one or more qualitative indications associated with the velocity measurements of the solid particles, and a controller operative to detect conditions in the gas transport stream carrying the solid particles in the transport pipe that are representative of pluggage of solid particles in the transport pipe as a function of information provided by the at least one solid particle velocity sensor, wherein the controller is configured to correlate the information provided by the at least one solid particle velocity sensor with conditions that are indicative of pluggage in the transport pipe based on solid particles that have fallen out of the gas transport stream and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

In accordance with a fourth embodiment, a method for detecting pluggage in a transport pipe that supplies solid particles in a gas transport stream from a solid particles feed source to a solid particles processing location is provided. The method of this embodiment comprises: obtaining velocity measurements of the solid particles with at least one solid particle velocity sensor; providing one or more qualitative indications associated with the velocity measurements of the solid particles from the at least one solid particle velocity sensor; and detecting conditions in the gas transport stream carrying the solid particles in the transport pipe that are representative of pluggage of solid particles in the transport pipe as a function of information provided by the at least one solid particle velocity sensor, wherein the detecting comprises correlating the information provided by the at least one solid particle velocity sensor with conditions that are indicative of pluggage in the transport pipe based on solid particles that have fallen out of the gas transport stream carrying the particles and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

DRAWINGS

The present invention will be better understood from reading the following description of non-limiting embodiments, with reference to the attached drawings, wherein below:

FIG. 1 is a simplified schematic representation of a fuel-fired boiler system that produces steam that can be used in power generation applications, of which a system and method for detecting early warning of pluggage of solids in a transport pipe according to the various embodiments of the invention can be deployed;

FIG. 2 is a schematic representation of further details of a furnace of a boiler like that depicted in FIG. 1 with an example of a configuration of windboxes on the walls having gas and fuel compartments that receive a gas transport stream carrying solid fuel particles delivered from at least one pulverizer by fuel transport pipes that inject a mix of the gas stream and solid fuel particles into the furnace for combustion, of which early detection of pluggage in the pipes by any particles that have fallen out from the gas stream and accumulated in the pipes can be attained according to the various embodiments of the invention;

DETAILED DESCRIPTION

Figure 1:
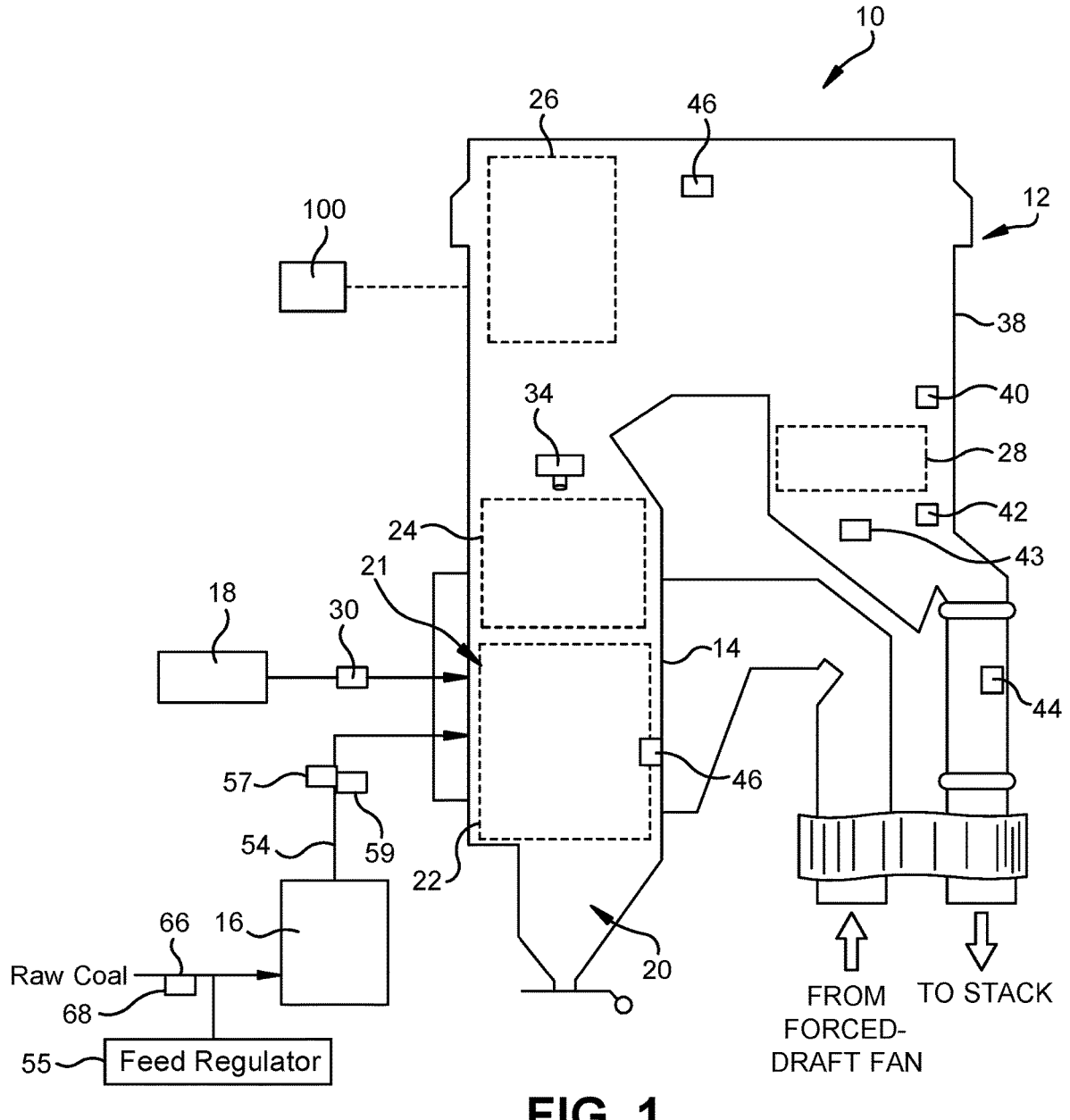

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to pneumatic transport of solid particles from one location to another location, and more particularly, to a system and method for detecting early warning of pluggage in a transport pipe, duct, tube, conduit or the like, that supplies the solid particles in a gas transport stream from a solid particles feed source location to a processing location based on primary and secondary measurement information obtained from one or more sensors (e.g., at least one doppler radar-based mass flow sensor and/or at least one solid particle velocity sensor) and combining indications from the sensors to provide a more reliable early warning of potential solid particles pluggage in the transport pipe. In general, as used herein, detecting pluggage means detecting conditions that are suggestive of current or future pluggage of a pipe. This is intended to cover conditions that can lead to partially or fully plugged pipes. The following description contains numerous examples of detecting pluggage and detecting conditions that are suggestive of current or future pluggage of a pipe to convey the various embodiments. Unless expressed otherwise in these examples, detecting pluggage and detecting conditions that are suggestive of current or future pluggage of a pipe are meant to encompass current or future pluggage of a pipe.

The detection of early warning of pluggage in a transport pipe, duct, tube, conduit or the like, that supplies the solid particles in a gas transport stream is described in the various embodiments in relation to a combustion system that includes a boiler with a furnace to burn pulverized solid particles of fuel and create thermal energy or heat based on solid fuel particles transported from at least one pulverizer to the boiler via one or more fuel transport pipes, ducts, tubes or conduits. Although the various embodiments are described with respect to a combustion system including a boiler with a furnace, at least one pulverizer, and one or more fuel transport pipes, it is understood that these embodiments have applicability with a number of industries that transport solids from one location to another location in a gas transport stream via a transport pipe, duct, tube or conduit. Accordingly, the details of the various embodiments that pertain to detecting early warning of pluggage of solid particles in a transport pipe are not meant to be limited to a combustion system including a boiler with a furnace, at least one pulverizer, and one or more fuel transport pipes to transport solid fuel particles. For example, the embodiments are applicable with other combustion systems that transport other types of solid particles of fuel, reagents or by-products of combustion from one location to another location, such as ash, powdered lime or limestone.

In addition, the various embodiments have applicability beyond combustion systems. In particular, the embodiments have applicability in a number of industries that transport solids from one location to another location in a gas transport stream via a transport pipe, duct, tube, conduit or the like. Examples of other industrial and manufacturing scenarios that the various embodiments may have applicability include, but are not limited to, transporting plastic pellets to a molding operation, transporting solid particles to a firing system of a smelting operation, transporting ash, edible grains, plastic particles, metal particles, sawdust, etc. In essence, the various embodiments described herein have utility with any industrial and manufacturing application that transports solids in a transport pipe, duct, tube, conduit, or the like from a first location to a second location via a gas transport stream, and where there is a possibility that the solids can plug, block, or obstruct the transport pipe.

Turning now to the figures, FIG. 1 shows a schematic of a fuel-fired boiler system 10 having a boiler 12 with a furnace 14 and combustion chamber therein that combusts a mixture of a fuel with a gas (e.g., air, or air mixed with other gases) to generate a flame that is used to produce steam that can be utilized in power generation applications with a steam driven generator. The boiler 12 may include T-fired boilers and wall-fired boilers with burners (not shown) located on corners and walls of the boilers, respectively, to ignite the mixture of fuel and gas. Although the description of the various embodiments of the invention is directed to T-fired boilers and wall-fired boilers, it is not meant to be limiting as aspects of the embodiments can have applicability with other types of boilers that can include, but are not limited to, suspension burners for biomass boilers, dutch oven boilers, hybrid suspension grate boilers, and fire tube boilers.

Referring back to FIG. 1, the fuel-fired boiler system 10 can include a fuel source such as, for example, a pulverizer 16 that is configured to grind fuel such as coal to a desired degree of fineness and feed pulverized solid particles of the coal to the boiler 12. For clarity, the fuel-fired boiler system 10 of FIG. 1 is depicted with only one pulverizer. It is understood that the fuel-fired boiler system 10 can include one or more pulverizers. The pulverized coal can be passed from the pulverizer 16 to the boiler 12 in a gas transport stream (e.g., air, or air mixed with other gases) via a fuel transport pipe 54. It is understood that the fuel transport pipe 54 represents only one type of fuel distribution modality that can be used to supply pulverized solid particles of fuel from the pulverizer 16 to the boiler 12. Other modalities such as transport ducts, tubes, conduits and the like can be used to supply pulverized solid particles of fuel carried in a gas transport stream from the pulverizer 16 to the boiler 12. Moreover, these transport ducts, tubes, conduits and the like can be used in other embodiments to supply solid particles in a gas transport stream from a solid particles feed source location to a solid particles processing location. The designation of the fuel transport pipe 54 in this combustion system embodiment and a transport pipe in other less specific scenarios described herein are not meant to be limited to a pipe as these transport ducts, tubes, conduits and the like are equally applicable. Accordingly, the use of the term "pipe" herein is intended to collectively cover transport ducts, tubes, conduits and the like.

For clarity, the pulverizer 16 of the fuel-fired boiler system 10 of FIG. 1 is depicted with only one fuel transport pipe 54. It is understood that the pulverizer 16 can include more than one fuel transport pipe 54 to supply pulverized solid particles of fuel (e.g., coal) to the burners of the boiler 12. In general, the pulverizer 16 can have a number of fuel transport pipes 54 extending out from the pulverizer in a parallel pipe configuration that can distribute pulverized solid particles of fuel to burners disposed on the corners of the boiler 12 in the case of a T-fired boiler, or on one wall or opposing walls of the boiler in the case of a wall-fired boiler. In one example, the pulverizer 16 can have four fuel transport pipes 54 in a parallel configuration that each supply the pulverized solid particles of coal to one of the burners located on each of the corners of the boiler 12 in the case of a T-fired boiler. It is understood that a number of multi-parallel transport pipe configurations are possible, and the various embodiments described herein are not meant to be limited to any one particular configuration.

The fuel-fired boiler system can include a feeder 66 to feed raw coal into the pulverizer 16 such as for example, a gravimetric feeder. As is known in the art, the gravimetric feeder 66 can include a scale 68 to weigh the coal and feed a specified amount of the coal to the pulverizer 16 at a particular velocity via a rotary or belt.

A coal feed regulator 55 can regulate the throughput of the raw coal (e.g., the amount and velocity) entering through the pulverizer 16 by way of the feeder 66, for milling or grinding and eventual supply of the pulverized coal to the burners of the boiler 12 by the transport pipe 54. Other functions that can be performed by the coal feed regulator 55 can include, but are not limited to, setting a milling or grinding capacity based on the size of the raw coal, moisture content of the raw coal, and the desired fineness level to be achieved by the milling. With these functionalities, the coal feed regulator 55 can be used to specify how much and how fast raw coal enters the pulverizer (e.g., pounds of coal/hour) for a particular milling capacity to achieve a desired throughput.

It is understood that the fuel-fired boiler system 10 can utilize other types of feeders to supply a specified amount of coal at a particular velocity to the pulverizer. For example, a volumetric feeder can be used to supply the coal based on volume of the coal. A factor that can affect the volume that is specified includes the consistency of the density of the coal that can change with size, moisture content, and a variety of other factors. Accordingly, in this example, coal feed regulator 55 can include a volumetric-type coal feed regulator to operate in conjunction with the volumetric feeder.

The fuel-fired boiler system 10 of FIG. 1 can include sensors disposed about the fuel transport pipe 54 to obtain various measurements of the distribution of the pulverized solid particles of fuel from the pulverizer 16 to the burners of the boiler 12 via the transport pipe. For example, the sensors can obtain measurements that include, but are not limited to, mass flow of the solid particles of fuel carried by the gas transport stream, and velocity of the solid particles, temperature of the gas and solid stream, velocity of the gas stream, or pressure of the gas and solid stream. In one embodiment, at least one doppler radar-based mass flow sensor 57 can be operatively coupled to the fuel transport pipe 54 to emit microwave signals towards the gas transport stream carrying the solid particles in the transport pipe and measure reflections of the microwave signals from the solid particles in the gas transport stream that are indicative of the flow of the solid particles in the transport pipe. In one embodiment, at least one solid particle velocity sensor 59 can be operatively coupled to the fuel transport pipe 54 to obtain velocity measurements of the solid particles of the fuel and provide one or more qualitative indications associated with the velocity measurements of the solid particles. In one embodiment, at least one doppler radar-based mass flow sensor 57 and at least one solid particle velocity sensor 59 can be operatively coupled to the fuel transport pipe 54. Both the at least one doppler radar-based mass flow sensor 57 and the at least one solid particle velocity sensor 59 can be electrically connected or otherwise communicatively coupled to a plant control unit 100 for communication of the information obtained from these sensors for further analysis and assessment. In one embodiment, the information from the at least one doppler radar-based mass flow sensor 57 and the at least one solid particle velocity sensor 59 can be used to detect conditions in the gas transport stream carrying the solid particles of fuel in the fuel transport pipe 54 that are representative of pluggage of solid particles in the transport pipe. Below are further details of the at least one doppler radar-based mass flow sensor 57 and the at least one solid particle velocity sensor 59 and the early warning detection of pluggage of solid particles in the fuel transport pipe 54.

An air source 18 such as for example a fan, can supply auxiliary air or combustion air to the boiler 12, where it is mixed with the fuel and gas in the gas transport stream that carries the fuel from the pulverizer 16 and combusted in the furnace. Further details of the combustion process are discussed below in more detail.

Although the fuel-fired boiler system 10 is described as a coal-based boiler system, it is understood that other boiler systems can use other types of pulverized solid particles of fuel, as well as liquid or gaseous fuels. Examples of other types of pulverized solid fuel that can be used with the fuel-fired boiler system 10 can include, but are not limited to, biomass, wood, peat, grains, and coke, while liquid or gaseous fuels can include, but are not limited to, oil, natural gas, producer gas, and chemical byproducts from industrial processes.

As shown in FIG. 1, the boiler 12 can have a burner zone 21 that includes a main burner zone 22 and a burnout zone 24 above the main burner zone to form the combustion chamber of the furnace 14. The main burner zone 22 receives the mixture of fuel with gas from the pulverizer 16 via the fuel transport pipe 54 and the auxiliary air from the air source 18. The mixture of fuel, gas and auxiliary air is ignited by the burners (not shown) as it is introduced into the main burner zone 22. The ignition of the mixture of fuel, gas and auxiliary air leads to combustion and flame generation.

A hopper zone 20 can be located below the main burner zone 22 for the removal of ash that results from the combustion of the fuel, gas and auxiliary air, while the burnout zone 24 above the main burner zone 22 can combust any gas or fuel that is not combusted in the main burner zone 22 with the aid of overfire air introduced above the main burner zone 22 and the fuel, gas and auxiliary air added into the main burner zone via the pulverizer 16 and the air source 18.

The flame resulting from the combustion of the fuel and air in the main burner zone 22 and the burnout zone 24 creates thermal energy. The thermal energy is used to heat a liquid or vapor such as water or steam in waterwall tubes (not shown) that line the walls of the furnace 14. The heating of the water in the waterwall tubes creates saturated water which can be separated into water and steam in a boiler drum (not shown) or the water may be converted to steam in the waterwall tubes. A superheater zone 26 with superheater circuits can superheat the steam for supply to a steam turbine (not shown) to generate electricity or provide heat for other purposes.

Combustion of the fuel, gas and auxiliary air within the boiler 12 produces a stream of flue gases that are ultimately treated and exhausted through a stack downstream from an economizer zone 28 which contains an economizer that can be used to preheat feedwater supplied to the boiler drum of the boiler with flue gases. As used herein, directions such as "downstream" means in the general direction relative to the flue gas flow, while the term "upstream" refers to a direction of the flue gas that is opposite the "downstream" direction relative to the flow of the flue gas.

The fuel-fired boiler system 10 of FIG. 1 can include an array of sensors, actuators and monitoring devices to monitor and control the combustion process. For example, the pulverized solid fuel-fired boiler system 10 may include a plurality of air flow control devices 30 associated with a conduit that supplies the auxiliary air from the air source 18 to the boiler 12 for introduction into the main burner zone 22 by auxiliary air nozzles (not shown) for combustion with the fuel, gas and auxiliary air introduced and ignited into the main burner zone 22 by the burners. In an embodiment, the air flow control devices 30 may be electrically or pneumatically actuated air dampers that can be adjusted to vary the amount of air that is provided to each of the auxiliary air nozzles that are associated with respective burners. Other examples of air flow control devices can include, but are not limited to, variable orifices, flow diverters, baffles, sliding gates, or turning vanes and blades as well as multiple designs of dampers. Each of the air flow control devices 30 can be individually controllable by the control unit 100 to ensure that desired air-to-fuel ratios and flame temperatures are achieved for each burner or fuel nozzle location.

The fuel-fired boiler system 10 of FIG. 1 can further include a plurality of flame scanners 46 associated with each burner and corresponding fuel nozzle that provides a stream of the fuel and gas from the gas transport stream into the main burner zone 22. The flame scanners can perform a number of operations. In general, the flame scanners 46 can be used to determine if a flame is present in the main burner zone 22 and the overall quality of the flame. In addition, the flame scanners 46 can calculate a number of characteristics of the flame including but not limited to, the average intensity of the flame, the variation in the brightness of the flame, the frequency that the brightness of the flame changes, and the temperature of the flame. The flame scanners 46 may provide the characteristics for one or more different ranges of optical wavelengths. The flame scanners 46 can be electrically connected or otherwise communicatively coupled to the control unit 100 for communication of this information. Although the flame scanners 46 are described about the main burner zone 22, other configurations are possible. For example, as shown in FIG. 1, the flame scanners 46 can be positioned in an upper portion of the furnace for monitoring and assessing further flame characteristics (e.g., temperature). In one embodiment, the flame scanners 46 can comprise two-dimensional optical flame scanners such as an in-furnace camera or optical thermography system. In general, the flame scanners 46 can include any commercially available flame scanner like the Perfecta or Exacta flame scanner systems provided by the General Electric Company or functionally equivalent flame scanner systems from other suppliers.

In addition to the flame scanners 46, the fuel-fired boiler system 10 can also include a flame stability monitor 34 located, for example, just above the burnout zone 24 that can be configured to measure or otherwise assess fireball stability within the boiler 12. The flame stability monitor 34 can also be electrically connected or otherwise communicatively coupled to the control unit 100 for communication of this information for further analysis and assessment of the combustion stability.

In one embodiment as shown in FIG. 1, in the backpass 38 of the boiler 12, upstream from the economizer zone 28, a monitoring device 40 can be situated to monitor flue gases. In an embodiment, the monitoring device 40, which can include a plurality of flue gas sensors, can be configured for measurement and assessment of gas species that include, but are not limited to, carbon monoxide (CO), carbon dioxide ($CO_2$), mercury (Hg), sulfur dioxide ($SO_2$), sulfur trioxide ($SO_3$), nitrogen dioxide ($NO_2$), nitric oxide (NO) and oxygen ($O_2$) within the backpass 38. $SO_2$ and $SO_3$ can be collectively referred to as SOx, while $NO_2$ and NO can be collectively referred to as NOx. It is understood that in other embodiments, the monitoring device 40 can be situated downstream of the economizer instead of upstream as the lower gas temperature downstream of the economizer can be easier to measure.

In one embodiment, the monitoring device 40 can include a laser-based monitoring device such as, for example, a tunable diode laser flue-gas monitoring device. The monitoring device 40 may include one or more optical sources that may, for example, pass through a portion of a flue gas duct defined by the backpass 38. The optical sources can provide optical beams that pass through the flue gases within the backpass 38 and are detected by a corresponding plurality of optical detectors (not shown). As the beams pass through the flue gases, there is absorption of various wavelengths characteristic of the constituents within the flue gases. The optical sources can be coupled to a processor to provide for characterization of received optical signals and identification of the constituents, their concentrations and other physical properties or parameters of substances in the flue gases. In other embodiments, such analysis may be performed internally by the control unit 100.

The fuel-fired boiler system 10 of FIG. 1 can further include a plurality of flue gas sensors 42 downstream from the economizer zone 28 that are operative to obtain measurements of a plurality of properties associated with the flue gases. The measurements of the plurality of properties can provide information that is indicative of the combustion that occurred in the burner zone. In one embodiment, the plurality of flue gas sensors 42 can be configured to detect gas species that include, but are not limited to, CO, $CO_2$, Hg, SOx, NOx and $O_2$ within the flue gases that are downstream of the economizer zone 28. The plurality of flue gas sensors 42 can include laser-based detectors, although other types of detectors capable of detecting the amount gas species in the flue gas may also be utilized without departing from the broader aspects of the invention. These flue gas sensors may, for example, alternately extract samples of the flue gas through probes inserted into the economizer outlet duct. The extracted flue gas samples are then transported to one or more chemical analyzers located outside the flue gas duct. The plurality of flue gas sensors 42 may likewise be electrically or communicatively coupled to the control unit 100 for transmitting data relating to the measurements obtained by the sensors 42.

In one embodiment, one or more temperature sensors 43 can be deployed about the flue gas to detect the temperature of the flue gas in this section of the boiler 12. The temperature sensors 43 can also be electrically or communicatively coupled to the control unit 100 for transmitting data relating to the temperature measurements obtained by the sensors 43.

It is understood that the plurality of flue gas sensors 42 and the temperature sensors 43 can be disposed in other locations about the boiler 12 in addition to or in place of those located downstream of the economizer zone 28. For example, it may be desirable to have flue gas sensors 42 and temperature sensors 43 located about the superheater zone 26 or a reheater zone if a reheater is deployed with the boiler. To this extent, in one embodiment, the information provided by the flue gas sensors 42 and the temperature sensors 43 at this section can be used to obtain an understanding of the combustion in the boiler based on the heat exchange that occurs at the superheater zone 26 and reheater zone.

FIG. 1 further shows that the fuel-fired boiler system 10 can include an oxygen sensor 44 arranged within the outlet to the stack that is configured to monitor the concentration of oxygen within the flue gas. In one embodiment, the sensor 44 may be a paramagnetic sensor or a Zirconium Oxide sensor. The sensor 44 may also be communicatively coupled to the control unit 100 for relaying the detected oxygen concentration to the control unit 100.

While the array of sensors and monitoring devices discussed above may be utilized to detect, for example, CO, NOx and other emissions, $O_2$ distribution, flame information, temperatures and the like, various other sensors and monitoring devices may also be utilized within the fuel-fired boiler system 10. Other examples of sensors that can be deployed include but are not limited to pressure sensors to measure pressure drop between various locations within the boiler 12 or high frequency pressure pulsations caused by uneven combustion, and temperature sensors located at other locations within the boiler to measure temperature. In one embodiment, the stack may be configured with an opacity monitor to assess the degree to which visibility of a background (i.e., blue sky) is reduced by particulates for use in determining the amount or concentration of particulates within the flue gases exiting the stack. In one embodiment, wall condition sensors can be deployed about the waterwall of the boiler to assess heat flux and furnace wall conditions such as corrosion and/or deposit buildup.

It is understood that the components of the boiler 12 depicted in FIG. 1 do not represent all of the elements that can be part of a boiler. Those skilled in the art will appreciate that a boiler can have other components depending on the type and purpose, such as for example, sub-critical steam generation or super-critical steam generation. For sake of clarity and for a general understanding of the various embodiments, the components depicted in FIG. 1 are for purposes of providing a basic understanding of a steam boiler. The components and operation are not meant to limit the various embodiments as it is understood that the components and operation of the boiler can vary.

Figure 2:
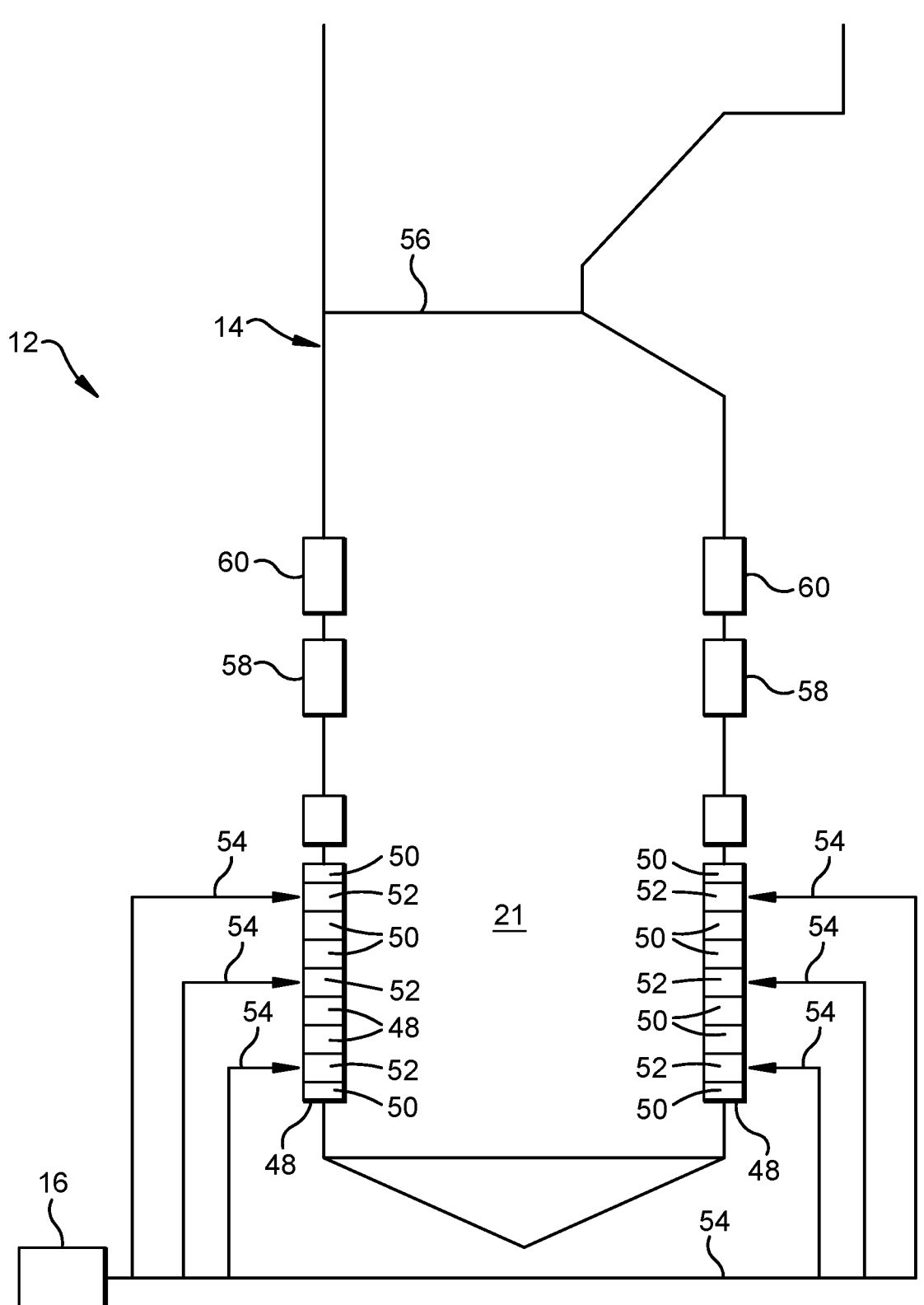

As noted above, the fuel carried by the transport gas stream in the fuel transport pipe 54 from the pulverizer 16 mixes with the auxiliary air provided by the air source 18 and the overfire air added above the fuel and gas mixture and combusts in the burner zone of the furnace 14 which leads to flame generation. FIG. 2 shows a schematic representation of this portion of the boiler 12 depicted in FIG. 1 with further details of the supply of the solid particles of fuel in the gas transport stream from the pulverizer 16 to the boiler via the fuel transport pipe 54 and the combustion of the fuel and gas in the furnace 14 according to an embodiment of the invention.

In the schematic of FIG. 2, one or more windboxes 48, which may be positioned on corners of the furnace 14 in the case of a T-fired boiler or on a single or opposing walls of the furnace in the case of a wall-fired boiler. In the embodiment depicted in FIG. 2, the windboxes 48 are positioned in the corners of the boiler 12 and thus can correspond to a T-fired boiler. Each windbox 48 can have a plurality of air compartments 50 through which auxiliary air supplied from the air source 18 (not shown in FIG. 2) is injected into the burner zone 21 (i.e., the main burner zone). Also disposed in each windbox 48 is a plurality of fuel compartments 52, through which fuel and gas provided from the pulverizer 16 is injected into the main burner zone 21 via a plurality of fuel transport pipes 54 arranged in a parallel configuration. The pulverizer 16 can be operatively connected to a gas source (e.g., air, or air mixed with other gases), such that the gas stream generated by the gas source transports the solid particles of fuel from the pulverizer 16 via the fuel transport pipes 54 through the fuel compartments 52, and into the main burner zone of the burner zone 21 in a manner which is well known to those skilled in the art.

In this arrangement, the plurality of fuel compartments 52 and the plurality of air compartments 50 define an elevated arrangement of fuel and air introduction locations along the corners of the furnace 14 in the case of a T-fired boiler (or walls in the case of a wall-fired boiler) for introducing a mix of the fuel, gas and air into the main burner zone to generate a flame therein. In this arrangement, each of the plurality of fuel compartments 52 can include a burner having a fuel nozzle operative to provide a stream of the fuel and gas into the main burner zone, while the plurality of air compartments 50 can each include one or more auxiliary air nozzle(s) that are operative to supply a stream of auxiliary air into the burner zone for contribution in the combustion with the fuel and gas provided by the fuel nozzles.

The burners and the corresponding fuel nozzles, as well as the auxiliary air nozzles can include any common assembly for these components that is well known to those skilled in the art. Further, it is understood that burners for liquid or gas fuels such as natural gas are more likely to have separate nozzles for air and fuel, compared to burners designed for pulverized solid fuel where the gas transport stream is used to transport the pulverized fuel. As used herein, a fuel nozzle that provides a stream of the fuel and gas into the burner zone embraces both a fuel nozzle operative to provide a stream of the fuel and gas into the burner zone such as with a pulverized solid fuel where the gas transport stream is used to transport the pulverized fuel, and closely coupled fuel and air nozzles performing a similar function like that associated with burners configured for liquid or gas fuels.

With the elevated arrangement of fuel and air introduction locations at the corners as depicted in FIG. 2, each elevation will correspond to a firing elevation level with one or more burners, with each level separated by an air compartment 50. In this manner, the burners and air compartments can generate a swirling and rotating fireball that meet just off-center of the furnace combustion chamber 14, filling most of its cross section. It is understood that the schematic representation depicted in FIG. 2 is representative of one configuration for a T-fired boiler and is not meant to be limiting. For example, there can be more firing elevation levels than that what is depicted in FIG. 2, or the boiler furnace can be wider with eight burners per elevation arranged to create two swirling fireballs from each group of four burners. Further, those skilled in the art will appreciate that a T-fired boiler can include for example four, five, six, seven, or eight levels. To this extent, a T-fired boiler can have a number of burners disposed at the four or eight corners of the furnace that range, for example, from 16 to 64, assuming four or eight corners and four to eight levels, although it is understood that other combinations of elevations and corners are also possible. Furthermore, it is understood that in this configuration for a T-fired boiler, there can be one or more pulverizers 16 for supplying the fuel and gas to the burners. For example, it is possible to have a separate pulverizer to feed the burners at each firing elevation level for each of the four or eight corners of the furnace via a multi-parallel fuel transport pipe configuration.

Referring back to FIG. 2, in order to aid the combustion of any gas or fuel that is not combusted in the main burner zone, one or more discrete levels of Separated OverFire Air (SOFA) can be incorporated in each corner of the boiler 12 so as to be located between the top of each windbox 48 and a boiler outlet plane 56 of the boiler, for example providing a low level of separated overfire air 58 and a high level of separated overfire air 60.

As noted above, a concern that can arise with fuel transport pipes is that the solid particles of fuel can fall out from the gas transport stream and accumulate in the bottom of the fuel transport pipes in the case of the horizontal sections of the pipes and against the edges or inner walls of the vertical sections. This can occur if the velocity of the solid particles carried by the gas transport stream does not satisfy a minimum gas stream velocity that is needed to carry the particles in the fuel transport pipes 54 from the pulverizer 16 to the burners of the boiler 12. Other factors that can have a role in the solid particles falling out from the gas transport stream and accumulating in the fuel transport pipes can include, but are not limited to, the size and moisture content of the particles after undergoing milling in the pulverizer, and aerodynamic drag that slows down the air stream near the pipe walls, which causes the particles to slow down with the reduced velocity of the air stream.

This concern that can arise with fuel transport pipes can occur with piping of a varying diameter sizes. For example, fuel transport pipes of a standard diameter size (e.g., diameters of 12 inches to 18 inches for mid side to large boilers) and pipes that have a larger diameter size (e.g., diameters of 22 inches to 28 inches) can have solid particles of fuel that can fall out from the gas transport stream. In general, pipe diameters are selected to give air/gas velocities within a standard range based on the volume of air moving through the pulverizer. For example a minimum velocity might be 70 feet per second with a maximum velocity of 100 to 120 feet per second. Essentially, the selection of the standard diameter and the larger diameter pipes are based on the air velocity range and not a specific pipe size.

The falling out of the pulverized solid particles of coal from the gas transport stream can occur in both the horizontal and the vertical sections of the fuel transport pipes. However, the pulverized solid particles of coal can fall out from the gas transport stream more often at vertical sections of the fuel transport pipes, especially those that are near the transitions between the horizontal and vertical sections. For example, sections of the fuel transport pipes above elbow sections that connect the horizontal sections with the vertical sections can be an area where the pulverized solid particles of coal can fall out from the gas transport stream because the velocity of the gas transport stream can be at its lowest due to the transition in the pipes from the horizontal section to the vertical section, and the edges of the pipes at these sections can put a drag on the flow just as the gas stream is trying push the fuel particles upward against gravity to reach the elevated burners. The gas transport stream at a lower velocity and the edges of the pipes putting a drag on the gas stream, all while going against gravity, are conditions that can cause the coal particles to fall backwards from the gas transport steam in a reverse direction in these vertical sections in relation to the normal flow path. To this extent, the coal particles can accumulate in the edges or inner walls of these vertical sections of the fuel transport pipes.

Particles of pulverized coal that fall out from the gas transport stream and accumulate in the fuel transport pipes can cause several problems. As noted above, the solid particles of coal that fall out from the gas transport stream can lead to changes in the ratio of air-to-fuel in the boiler that are not in conformance with ratios of air-to-fuel that have been specified for optimized combustion. Another problem is that solid particles that have fallen out from the gas transport stream and accumulated in the fuel transport pipes can create the risk of a bad fire that can include causing damage to the pipes and placing nearby personnel in significant danger. Moreover, fires in the fuel transport pipes can have significant economic ramifications to power plant operators. For example, if there is a bad fire, then that can lead to lost days and weeks of production (i.e., electricity generation, or other industrial processes using steam from the boiler) and capacity at millions of dollars a day if the boiler has to undergo a shutdown for maintenance. Further, if the boiler is shut down for maintenance, it may become necessary for the power plant operators to buy replacement power on a spot market and that can be very costly especially if the shutdown occurs during periods of high demand.

The various embodiments can detect solids pluggage in a fuel transport pipe 54 from solid particles of fuel that have fallen out of the gas transport stream and accumulated in the bottom or inner walls of the pipe based on primary and secondary measurement information from one or more sensors and by combining indications from the sensors to provide an early warning of potential solids pluggage in the transport pipe. In one embodiment, the sensors can include one or more of the aforementioned at least one doppler radar-based mass flow sensor 57 and the at least one solid particle velocity sensors 59.

Figure 3:
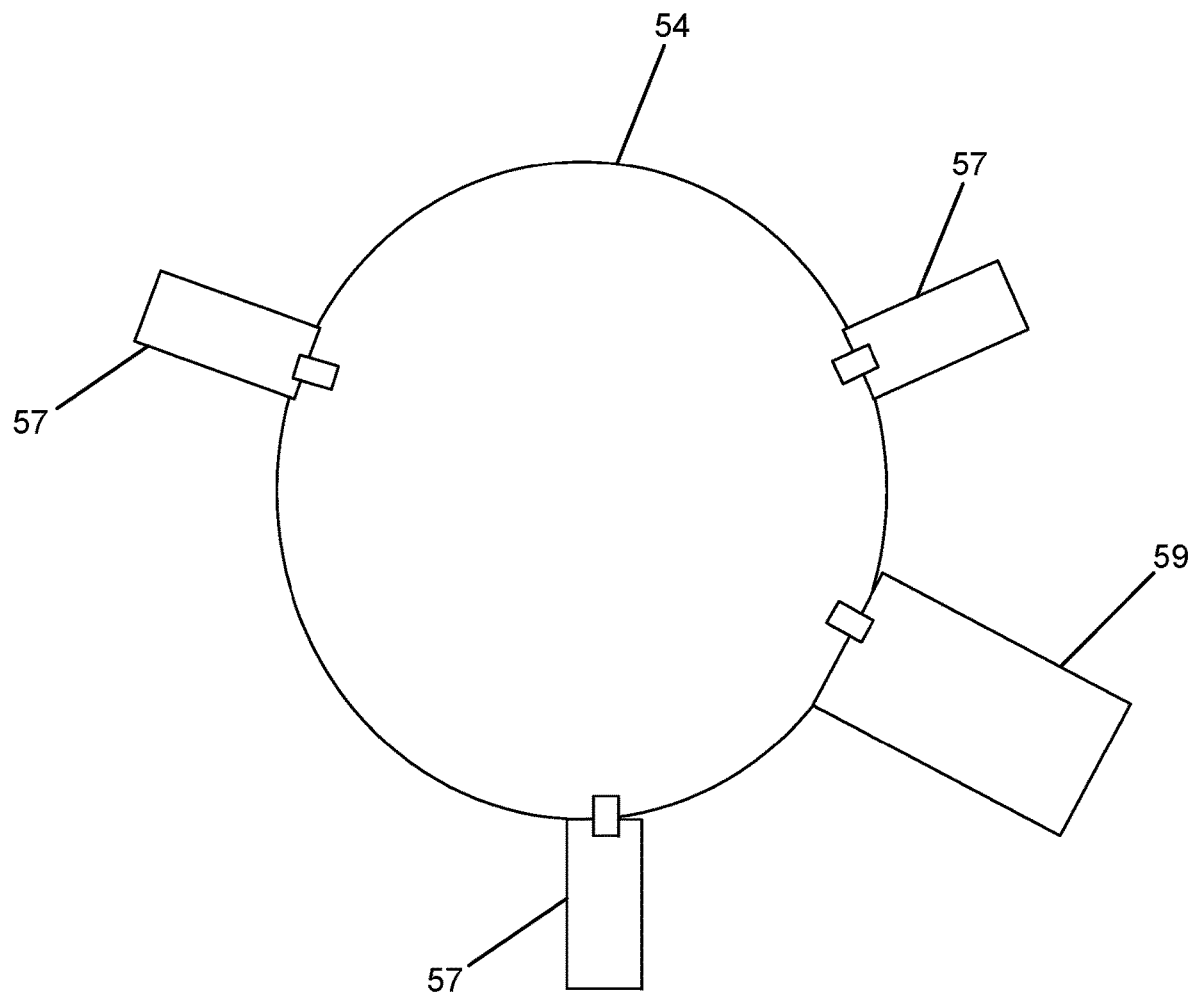
FIG. 3 is a schematic representation of a transport pipe with at least one doppler radar-based mass flow sensor and at least one solid particle velocity sensor operatively coupled to the transport pipe according to an embodiment of the invention.

FIG. 3 shows a schematic representation of an axial end view of a fuel transport pipe 54 with at least one doppler radar-based mass flow sensor 57 and at least one solid particle velocity sensor 59 operatively coupled to the transport pipe according to an embodiment of the invention. As noted above, the at least one doppler radar-based mass flow sensor 57 can emit microwave signals towards the gas transport stream carrying the solid particles of fuel in the fuel transport pipe 54 and measure reflections of electromagnetic waves from the solid particles as the particles flow past the sensor 57. Based on the reflected energy, the at least one doppler radar-based mass flow sensor 57 can determine the mass flow of the coal particles in the gas transport stream in real-time that is supplied to the burners of the boiler 12. The at least one doppler radar-based mass flow sensor 57 typically requires calibration based on a known mass flow of particles using an independent measurement of the mass flow, for example, by catching and weighing the mass of particles transported over a known period of time.

It has been observed that pockets of turbulence in the gas transport stream may also reflect the electromagnetic waves, and as result, the at least one doppler radar-based mass flow sensor 57 will include these measurements as part of the amount in the determination of the relative mass flow of the solid particles of coal. Essentially, the measured reflections of the electromagnetic waves from the pockets of turbulence in the gas transport stream result in a false signal that the at least one doppler radar-based mass flow sensor 57 measures as solid particle flow.

As discussed below in more detail, the various embodiments address the false signals that are generated from the turbulence in the gas transport stream and counted by the at least one doppler radar-based mass flow sensor 57 as part of the solid particle flow, by analyzing the mass flow measurements in more detail to arrive at a measurement that is more indicative of the mass flow of the solid particles of coal. In this manner, the various embodiments can use this information associated with the more realistic estimate of the mass flow of the solid particles to detect early warnings of solids pluggage in the fuel transport pipe 54.

In one embodiment, the more realistic measure of the mass flow of the solid particles can entail a correlation of the measurement information from the at least one doppler radar-based mass flow sensor 57 that includes comparing the measured reflections to an expected solid particles flow value of a related process variable derived from a flow of the solid particles of fuel moving into the pulverizer 16. For example, in one embodiment, the measured mass flow of the solid particles of fuel can be compared to or correlated against the feed rate from the feeder 66 that supplies the raw coal to the pulverizer 16 as specified by the coal feed regulator 55 (FIG. 1). This allows significant differences in the particle flow compared to the related process variable to be attributed to higher turbulence in the gas transport stream.

Higher turbulence measured in a straight section of a fuel transport pipe 54 can then be attributed to partial blockage, obstruction or plugging of the transport pipe that is typically caused by solid particles dropping out of the gas transport gas stream in for example, a horizontal flowing section of the transport pipe.

It is understood that the correlation of the measurement information from the at least one doppler radar-based mass flow sensor 57 with the expected solid particles flow value can be based on a process variable that is different from the feed rate of the coal into the pulverizer. In one embodiment, the expected solid particles flow value can be based on a change in weight of the solid particle. For example, with the feeder 66 (FIG. 1), such as a gravimetric feeder, the weight of the coal entering the pulverizer 16 is available from weight measurements obtained by the scale 68 (FIG. 1). Further, the velocity of the coal on the belt of the feeder 66 that is supplied to the pulverizer 16 is also known. To this extent, the mass flow of the coal entering the pulverizer 16 can be obtained by integrating weight and velocity of the coal at the feeder 66. In this manner, the mass flow information obtained from the at least one doppler radar-based mass flow sensor 57 can be used to ascertain the weight of the solid particles of fuel in the fuel transport pipe 54. This weight of the solid particles of fuel in the fuel transport pipe 54 derived from the measurement information of the at least one doppler radar-based mass flow sensor 57 can then be compared to the weight of the coal entering the pulverizer 16. Water or other liquids present in the solids entering the pulverizer may also evaporate during pulverization and therefore be weighed on the volumetric feeder while the evaporated liquids may not be measured by a doppler radar sensor. To this extent, changes in the weight of the solid particles of fuel in the fuel transport pipe 54 in relation to the weight of the coal entering the pulverizer 16 can correspond to changes in the flow in the pipe. In one embodiment, a predetermined weight threshold can be specified based on the feeder flow. In this manner, a comparison of the weight of the solid particles in the fuel transport pipe 54 based on the measurements from the at least one doppler radar-based mass flow sensor against the weight of the coal entering the pulverizer 16 can be used to detect pluggage using the threshold as a delineation for noting pluggage.

In another embodiment, the expected solid particles flow value can be based on a change in a chemical reaction rate of the solid particles at the boiler 12 from the chemical reaction rate of the solid particles entering into the pulverizer 16. For example, by working backwards from the combustion of the coal in the boiler 12, one can determine the amount of coal that was provided from the one or more pulverizers 16 to the burners of the boiler via the fuel transport pipe 54. In particular, as is known in the art, the coal consumption can be determined as a function of the generated steam by the boiler and the enthalpy of the steam. With this ability to determine coal consumption, one can use this information to determine how much coal was provided to the pulverizer 16. For example, the heating value of the fuel combined with the expected combustion efficiency and other expected heat losses can be used to calculate the quantity of coal burned to create the rise in enthalpy of the steam leaving the boiler. When the coal properties are known, the volume of air entering the boiler and the remaining fraction of oxygen in the flue gas leaving the boiler along with the air and flue gas temperatures can also be used to calculate the quantity of coal burned.

In another embodiment, the expected solid particles flow value can be based on the production output obtained from a solid particles processing location. For example, the rate of production from a molding process, the rate that a chemical reaction consuming particles in the processing location, or the level of a holding tank filled at the particle processing location.

As noted above, the at least one solid particle velocity sensor 59 can measure the velocity of the solid particles of the fuel in the fuel transport pipe 54 in real-time and provide one or more qualitative indications associated with the velocity measurements of the solid particles. The one or more qualitative indications provided by the one or more solid particle velocity sensors 59 that can be provided by the at least one solid particle velocity sensor is selected from the group consisting of an indication of whether there is a linear flow of the solid particles in the gas transport stream in the transport pipe that is in a direction that corresponds with a flow path that carries out supply of the solid particles in the gas transport stream from the solid particles feed source to the solid particles processing location, an indication of whether there is a flow of the solid particles in the gas transport stream in the transport pipe that is in a reverse direction to the flow path based on an interpretation of the velocity measurements (e.g., a reading of –20 ft/sec is indicative of flow in a reverse direction from the flow path as opposed to +20 ft/sec) or an express reverse flow direction statement noted with the velocity measurements (e.g., "flow is in a reverse direction"), status information of the velocity measurements of the solid particles in the gas transport stream (e.g., whether a measurement was made or not made (an indication that no measurement was made may indicate pluggage in the pipe)), the status information including a quality indicator denoting the quality of the velocity measurements in terms of classification accuracy (e.g. an indication of whether the measurement is of high quality or is of low quality), a direction of the flow of the particles in the velocity measurements, a confidence indicator denoting a confidence level in the quality of the velocity measurements (e.g. an indication of whether there is high confidence in the measurement, or if there is low confidence or uncertainty with the measurement), and combinations thereof.

In one embodiment, the at least one fuel particle velocity sensor 59 can include a triboelectric velocity sensor, although other particle velocity sensors that can obtain real-time fuel particle velocity measurements and provide qualitative indications associated with the velocity measurements are suitable for use with the various embodiments.

Other possible particle velocity sensors can include, but are not limited to, an image processing-based velocity sensor. For example, as is known in the art, an image processing-based velocity sensor can include a video camera taking multiple images per second, with image processing software that identifies specific particles or groups of particles in each image and identifies the amount of motion of each group of particles between different images taken over time. To this extent, such an image processing-based velocity sensor can be used with the various embodiments to obtain velocity measurements of the solid particle in the transport pipe and additionally provide one or more qualitative indications associated with the velocity measurements like those noted above. For example, in one embodiment, an image processing-based velocity sensor can capture multiple images from a video camera taking for example 30 or 60 images per second. Image processing software can be used to identify unique shapes of particles or groups of particles in each image. By comparing the relative positions of each unique shape across different still images taken over time, the velocity can be calculated as a function of the distance moved and the time difference between analyzed images. In this case, the image processing software might sometimes detect unique particle shapes moving opposite to the expected direction in addition to particle shapes moving in the expected direction.

It is understood that the various embodiments are not meant to be limited to use of a particle velocity sensor that includes either a triboelectric velocity sensor or an image processing-based velocity sensor. Instead, the various embodiments can be implemented with a particle velocity sensor configuration that includes one or more of a triboelectric velocity sensor and an image processing-based velocity sensor, or other velocity sensor technologies.

FIG. 3 shows the at least one fuel particle velocity sensor 59 in the form of a triboelectric velocity sensor. In operation, the triboelectric velocity sensor can measure small electrical currents carried by flowing solid particles of fuel as the particles pass by two or more electrodes that form a part of the velocity sensors. Variations in the electrical signal from the two or more electrodes can then be correlated with a time shift between the different electrode signals. With a known distance between electrodes and a time delay in the electrical signals correlated by time-shifting signals versus each other, the particle velocity can be calculated by dividing the distance by the time. Solid particles of fuel traveling in an opposite direction from the expected direction require time-shifting the electrical signals in the opposite direction from expected. In general, gas flow through a transport pipe has a lower velocity near the pipe walls due to drag and/or turbulence caused by the gas stream interacting with the solid wall of the pipe. Mounting the triboelectric sensor electrodes in a section of the fuel transport pipe 54 with upward flow may result in some particles slowing down with their transport gas stream near the pipe walls, and eventually falling back down the pipe if the force of the fuel transport gas is insufficient to overcome the mass of the particle. In the vicinity of transitions between horizontal sections and vertical sections of the pipe (e.g., near elbow sections) is one area where the triboelectric sensor electrodes may be placed about the fuel transport pipes 54. That is, after a transition from horizontal sections to vertical sections of the pipe (e.g., after elbow sections—e.g., five to ten pipe diameters downstream of a bend or elbow). In this scenario, these particles will tend to accumulate at the next bend in the fuel transport pipe 54 below the vertical section where the measurements can be made. The accumulated particles then cause additional turbulence in the stream of flowing gas and solid particles as the stream moves around the bend. This additional turbulence may continue up the fuel transport pipe 54 until it is detected by the at least one doppler radar mass flow sensor 57 as a false signal. It is understood that the particles may also fall backward in the gas stream in other locations such as, for example, further up the vertical section of the pipes. In particular, assuming that the particles turn the corner through the elbow with some velocity, if the force of the air is not sufficient to maintain that velocity as the particles travel upward in the vertical section of pipe, the particles will gradually slow down and eventually fall backwards down the pipe.

In one embodiment, the information from the at least one solid particle velocity sensor 59 can be correlated to ascertain whether the information is indicative of pluggage of solids in the fuel transport pipe 54. The correlation of the information from the at least one particle velocity sensor 59 can include evaluating the velocity measurements of the solid particles and the one or more qualitative indications for trends of changing behavior in the measurements. For example, the correlation of the information from the at least one solid particle velocity sensor 59 can include evaluating the velocity measurements for trends in instances that the velocity measurements are below a predetermined minimum velocity threshold, and evaluating the one or more qualitative indications for trends in instances that the one or more qualitative indications are suggestive of conditions corresponding to pluggage of solid particles in the transport pipe. Velocity measurements that are below the predetermined minimum velocity threshold and accompanying qualitative indications that are suggestive of conditions corresponding to pluggage of solid particles in the transport pipe (e.g., flow of particles in a non-linear flow direction, flow of particles in a reverse direction from the normal flow path, uncertain quality and confidence with the measurements, etc.) are representative examples of changing trends in the velocity measurement that can be attributed to solids accumulating in the transport pipe that may lead to complete pluggage in the fuel transport pipe 54.

As discussed below in more detail, if the correlation of information from either the at least one doppler radar-based mass flow sensor 57 or the at least one solid particle velocity sensors 59 is indicative of particles falling out of the gas transport stream that may lead to pluggage of solid particles in the transport pipe, then a warning can be generated to a plant operator. If the correlation of information from both the at least one doppler radar-based mass flow sensor and the at least one solid particle velocity sensor are indicative of a pluggage of solid particles in the transport pipe, then a more severe warning can be generated for the plant operator.

The implementation of the at least one doppler radar mass flow sensor 57 about the at least one solid particle velocity sensor 59 in FIG. 3 represents one possible configuration. As shown in FIG. 3, the doppler radar mass flow sensors 57 can be spaced apart from one another by 120 degrees. It is understood that the use of three doppler radar mass flow sensors 57 and the one solid particle velocity sensor 59 in FIG. 3 are not meant to be limiting, as there can be more or less doppler radar mass flow sensors arranged about the fuel transport pipe 54, and more solid particle velocity sensors 59 arranged about the fuel transport pipe.

Further, it is understood that the use of the at least one doppler radar mass flow sensor 57 and the at least one solid particle velocity sensor 59 can be located in various locations about the fuel transport pipe 54. That is, in a typical multi-parallel pipe configuration, it is possible to have an arrangement of doppler radar mass flow sensors 57 and solid particle velocity sensors 59 located about various locations throughout the many horizontal and vertical sections of the pipes that extend between the pulverizer 16 and the burners of the boiler 12. For example, it may be desirable to have doppler radar mass flow sensors 57 and solid particle velocity sensors 59 situated about each pipe section to achieve the most accurate measurement results.

Doppler radar based sensors are commercially available to measure the mass flow of particles in a gas stream as are solid particle velocity sensors to measure the velocity of solid particles transported through a transport pipe. In general, the at least one doppler radar mass flow sensor 57 and the at least one solid particle velocity sensor 59 can include a doppler radar mass flow sensor and a solid particle velocity sensor like those provided by Measuring Ideas Consulting (MIC GmbH), however, other functionally equivalent sensors from different suppliers are suitable for use with the various embodiments. For example, ultrasonic acoustic measurement technologies are illustrative, but non-limiting possible methods that may be utilized in sensors to obtain real-time measurements of the mass flow or velocity of solid particles in a gas stream. Turbulence causes time-of-flight differences for the acoustic signals as the variations in localized gas velocity affect the transmission speed of the acoustic waves, which may then be misinterpreted by the sensing system.

Figure 4:
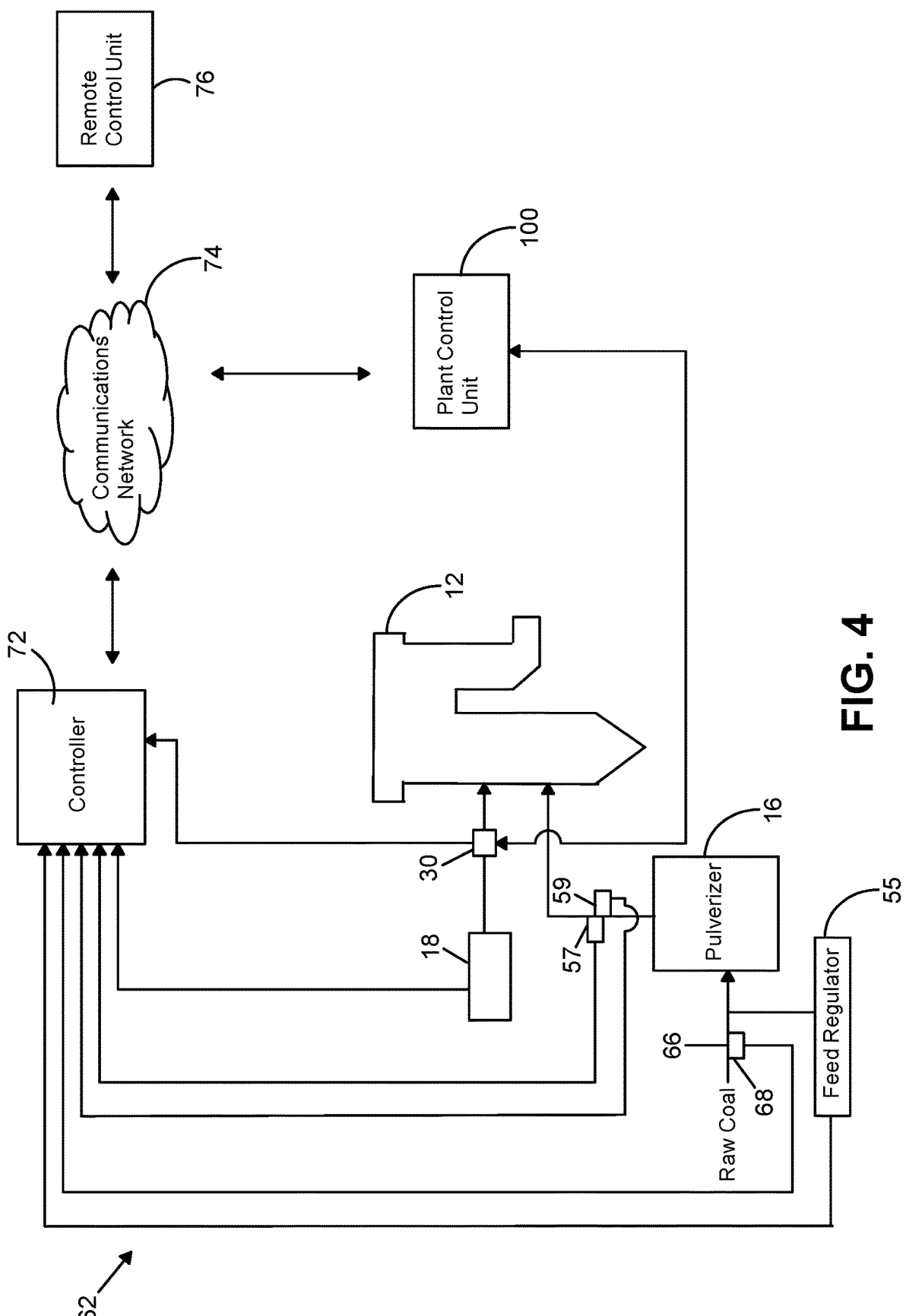
FIG. 4 is a schematic representation of a system for detecting early warning of pluggage of solids in a transport pipe used in a boiler like that depicted in FIGS. 1 and 2 with at least one doppler radar-based mass flow sensor and at least one solid particle velocity sensor operatively coupled to a transport pipe like that depicted in FIG. 3 according to an embodiment of the invention.

FIG. 4 is a schematic representation of a system 62 for detecting early warning of pluggage of solids in a fuel transport pipe 54 used to supply pulverized solid particles of fuel from a pulverizer 16 to a boiler 12 like that depicted in FIGS. 1 and 2, with one or more of at least one doppler radar-based mass flow sensor 57 and at least one solid particle velocity sensor 59 operatively coupled to the transport pipe according to an embodiment of the invention. As shown in FIG. 4, the system 62 includes a controller 72 operative to detect conditions in the gas transport stream carrying the solid particles in the fuel transport pipe 54 that are representative of an early warning of pluggage of solid particles in the transport pipe as a function of information provided by the at least one doppler radar-based mass flow sensor 57 and/or the at least one solid particle velocity sensor 59. In one embodiment, the controller 72 can utilize a solid particles pluggage detection algorithm to correlate the information provided by one or more sensors which may be doppler radar-based mass flow sensors or solid particle velocity sensors.

In one embodiment, the correlation that can be performed in the controller 72 by the particles pluggage detection algorithm from the information provided by the at least one doppler radar-based mass flow sensor 57 can include comparing the measured reflections to an expected solid particles flow value derived from a flow of the raw coal moving into the pulverizer via the feeder 66 and the feed regulator 55. The comparison of the measured reflections of the solid particles from the at least one doppler radar-based mass flow sensor 57 to the expected solid particles flow value set by the feed regulator provides a better understanding of the measured reflections obtained from the at least one doppler radar-based mass flow sensor 57 that are attributable to the reflections from the solid particles of the fuel in the gas transport stream carried by the fuel transport pipe 54 and not reflections that are attributed to turbulence in the gas transport stream that can lead to false measurement readings by the at least one doppler radar-based mass flow sensor 57. As noted above, the expected flow value can be derived from process variables that differ from the feed rate, such as for example, process variables that can include, but are not limited to, weight and chemical reaction rate of the solid particles of fuel.

In one embodiment, the correlation that can be performed in the controller 72 by the particles pluggage detection algorithm from the information provided by the at least one solid particle velocity sensor 59 can include evaluating the velocity measurements of the solid particles and the one or more qualitative indications for trends of changing behavior in the measurements. For example, the correlation of the information from the at least one solid particle velocity sensor 59 can include evaluating the velocity measurements for trends in instances that the velocity measurements are below a predetermined minimum velocity threshold, and evaluating the one or more qualitative indications for trends in instances that the one or more qualitative indications are suggestive of conditions corresponding to pluggage of solid particles in the fuel transport pipe 54.

If the correlation of information from either the at least one doppler radar-based mass flow sensor 57 or the at least one solid particle velocity sensor 59 is indicative of a pluggage of solid particles in the transport pipe 54, then the controller 72 can generate a warning to a plant operator at the plant control unit 100 via a communications network 74. If the correlation of information from both the at least one doppler radar-based mass flow sensor 57 and the at least one solid particle velocity sensor 59 are indicative of a pluggage of solid particles in the transport pipe, then a more severe warning can be generated for the plant operator at the plant control unit 100 via the communications network 74 that is indicative of potentially complete pluggage.

It is understood that the controller 72 can utilize other information processing techniques to detect solid particles pluggage based on information obtained by the at least one doppler radar-based mass flow sensor and the at least one particle velocity sensor, and thus the various embodiments are not meant to be limited to the use of a solid particles pluggage detection algorithm that utilizes statistical measures of variation in the information provided by the sensor as a basis to detect pluggage. For example, in one embodiment, the controller 72 can utilize an empirical-based solid particles pluggage detection model to correlate the information provided by the at least one doppler radar-based mass flow sensor and the at least one particle velocity sensors to detect solids pluggage in a fuel transport pipe 54. The empirical-based solid particles pluggage detection model can include any of a number machine learning models such as for example, principal components analysis models, neural network models, linear regression, decision trees, and the like, that can explain correlation of the information obtained from the sensors with respect to solid particles pluggage in a transport pipe and use this correlation to predict solid pluggage in the pipe based on incoming sensor measurements. In general, any of these machine learning models can be utilized to derive an understanding of the measurements from the at least one doppler radar-based mass flow sensor 57 and/or the at least one particle velocity sensor 59 in a manner that encompasses the operations performed by the solid particles pluggage detection algorithm, such that patterns of data from these sensors can be associated with conditions in the fuel transport pipe 54 that are indicative of pluggage of solids and conditions that are not are not representative of pluggage. To this extent, these machine learning models can apply these patterns to new measurements obtained from the doppler radar-based mass flow sensor(s) 57 and/or the particle velocity sensor(s) 59 in order to detect whether there is pluggage of solids in the fuel transport pipe 54.

An illustrative, non-limiting example, of a machine learning model that can be used to detect pluggage of solid particles in a fuel transport pipe based on information obtained from the doppler radar-based mass flow sensor measurements and/or the particle velocity sensor measurements is as follows. In one embodiment, if partial or complete solids pluggage has been confirmed by inspection or other means, a supervised machine learning approach can be used to train an empirical model, for example a Neural Network. For example, a variety of time-series data from normal operation can be combined with time-series data collected for the hours before the pluggage was independently confirmed. By labelling the data collected before the pluggage was independently confirmed as potential pluggage in the training data set and separately labeling the normal operational data, the empirical model can be trained to detect similar conditions in future time-series data.

It is understood that the controller 72 is not limited to use of either the solid particles pluggage detection algorithm or the empirical-based solid particles pluggage detection model to detect solids pluggage in a transport pipe. Those skilled in the art will appreciate that the controller 72 can use one or more of the solid particles pluggage detection algorithm and the empirical-based solid particles pluggage detection model to detect solids pluggage in a transport pipe. That is, the controller 72 can use only the solid particles pluggage detection algorithm, only the empirical-based solid particles pluggage detection model, or a combination of the solid particles pluggage detection algorithm and the empirical-based solid particles pluggage detection model to detect solids pluggage in a transport pipe.

Although the discussion with regard to FIG. 4 entails the use of both the doppler radar-based mass flow sensor(s) 57 and the particle velocity sensor(s) 59 to detect solids pluggage in a fuel transport pipe, it is understood that the detection can also be based on only the doppler radar-based mass flow sensor(s) or only the particle velocity sensor(s). In these scenarios, the detection of solids pluggage in a fuel transport pipe based on information obtained from either the doppler radar-based mass flow sensor(s) or the particle velocity sensor(s) can be ascertained in the same manner discussed for each of these sensors.

It is also understood that the system 62 of FIG. 4 can collect other information about the boiler 12 in addition to the measurements from the at least one doppler radar-based mass flow sensor 57 and/or the at least one solid particle velocity sensor 59. In particular, the system 62 can collect information from various sensors and monitoring devices situated about the boiler to control the combustion of the solid particles of fuel carried in the gas transport stream by the fuel transport pipe that is supplied to the burners of the boiler 12 for ignition and combustion in the furnace. For example, one or more auxiliary air flow sensors can obtain real-time measurements of the flow of the auxiliary air (combustion air) supplied into the burner zone by one or more of the plurality of auxiliary air nozzles in the plurality of air compartments (FIG. 2).

The controller 72 can also receive information from the flame scanners 46 (FIG. 1) situated about the furnace to obtain flame scan data of the flame in the burner zone 21 (FIG. 2) of the boiler 12. The scan data of the flame obtained by the flame scanners 46 can include any of the aforementioned information discussed previously with respect to the flame scanners. In one embodiment, flame scan data from the flame scanners 46 can be used by the controller to help identify partial pluggage in the fuel transport pipe 54 using a solid particles pluggage detection algorithm and/or an empirical-based solid particles pluggage detection model. For example, if the quality of the flame from a burner changes as the feed pipe becomes partially plugged, the intensity and/or frequency of the flame measured by the flame scanner may decrease. These flame scanner measurements may also decrease with lower fuel flows. By correlating these measurements against their expected values based on the expected coal particle flow, differences in the flame scanner signals may be combined with primary and secondary indications from the doppler radar mass flow sensors and/or particle velocity sensors as an additional indication of particles dropping out of the gas stream.

The controller 72 can also receive measurements from a plurality of flue gas sensors 42 (FIG. 1) to obtain information of a plurality of properties associated with the flue gases. The measurements of the plurality of properties obtained by the flue gas sensors 42 can provide information that is indicative of the combustion that occurred in the burner zone.

The controller 72 can also collect other information about the boiler 12 such as information associated with the air flow control devices 30 that control the supply of the streams of auxiliary air into the burner zone by the plurality of auxiliary air nozzles. The plurality of air flow control devices 30, which can include electrically or pneumatically actuated air dampers, as these devices affect the actual air flow near each burner. The information collected from the air flow control devices 30 and that can be used by the controller 72 to optimize combustion can include, but are not limited to, the position of each of the air flow control devices 30, as well as their operational status.

It is understood that all of this other information that can be collected by the controller 72, that is in addition to the measurements provided by the at least one doppler radar mass flow sensor 57 and the at least one velocity particle sensor 59, and that can be used to optimize combustion of the boiler 12, are illustrative of some of the information that can be processed by the controller and used as part of the optimization process, and are not meant to be limiting. For example, one or more pressure sensors can obtain pressure measurements about the furnace of the boiler 12.

It is understood that the communications between the controller 72, the plant control unit 100 and a remote control unit 76 (which can perform any of a number of activities including but not limited to, performing remote monitoring and diagnostics of the controller and the plant control unit, reviewing boiler operation and warnings of any detection of solids pluggage in the fuel transport pipe 54, and directing any corrective actions in response to the solids pluggage detection warnings if deemed necessary, via the communications network 74) can include any of the well-known communication networks and data communication protocols used to communicate information between such networks. For example, wide area networks (WAN) and local area networks (LAN) can be used with the communications network 74 to enable communications between the controller 72, the plant control unit 100 and the remote control unit 76, while using a data communication protocol such as Modbus TCP/IP or other communication protocols such as OPC (OLE for Process Control) to facilitate the communication of information between each of these components.

Further, the implementation depicted in FIG. 4 represents only one approach to deploying the system 62, and is not meant to be limiting as those skilled in the art will appreciate that the system 62 can take the form of other configurations. For example, the controller 72 may be localized on one computer and/or distributed between two or more computers. Also, the controller 72 and plant control unit 100 may be distributed to one or more control units in different arrangements and still operate in accordance with the various embodiments of the invention. For example, instead of having the controller 72 and the plant control unit 100 configured as separate components, it is understood that these components can be merged into a single unit or split into three or more units. In one embodiment, the controller 72 can be integrated in the plant control unit 100, such that the data from the various sensors and devices is provided to the plant control unit, and solids pluggage detection aspects of the various embodiments can be performed by a solids pluggage detection component within the plant control unit. Further, it is understood that the system 62 depicted in FIG. 4 is applicable to operate with the boilers depicted in FIGS. 1 and 2. Moreover, as noted above, the boilers depicted in FIGS. 1 and 2 are representative of only one boiler arrangement and is not meant to be limiting to the various embodiments, as those skilled in the art will appreciate that the system 62 and its operation has applicability with other boiler configurations.

Figure 5:
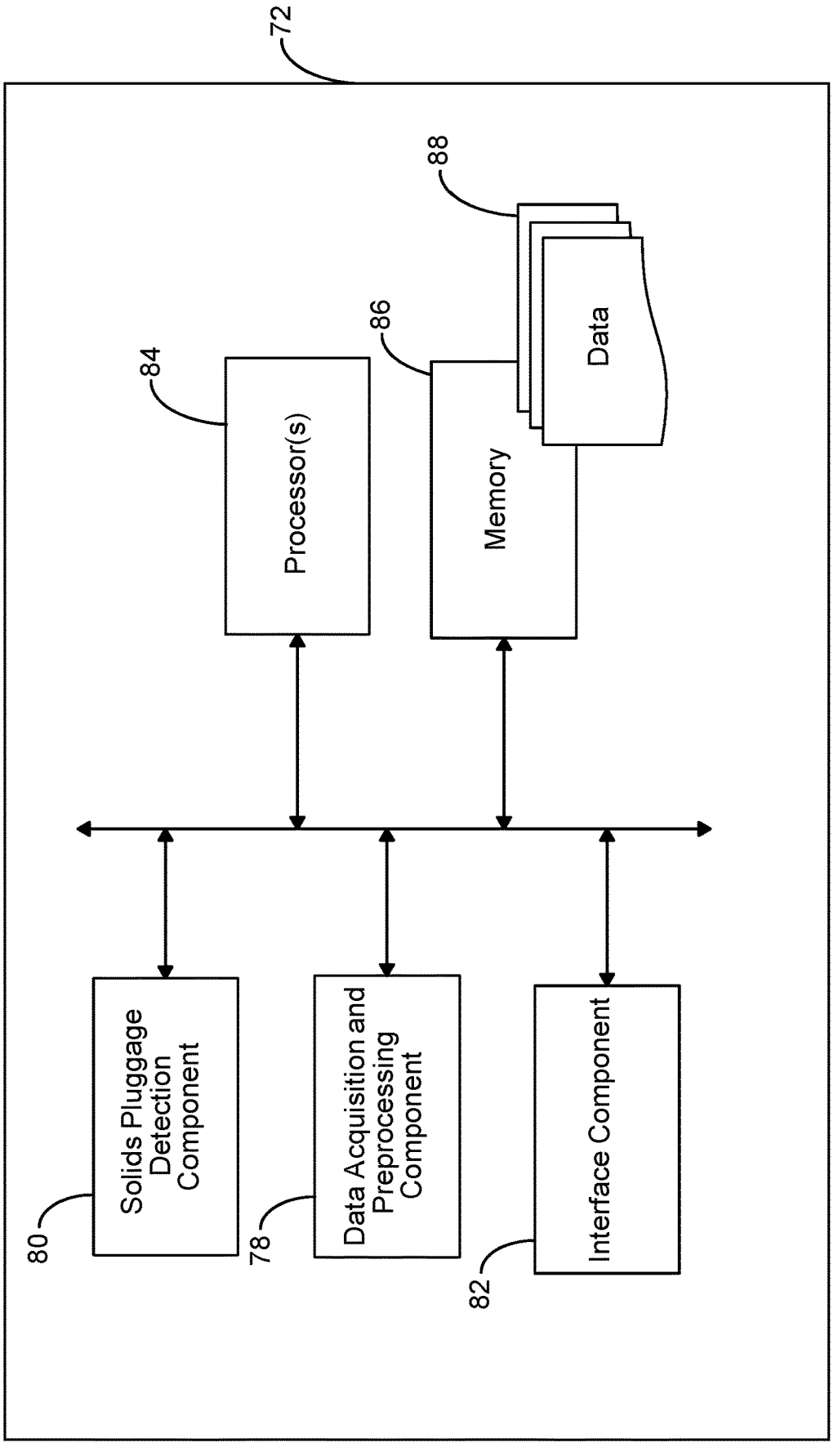
FIG. 5 is a block diagram showing more of the details of the controller depicted in FIG. 4 according to an embodiment of the invention.

FIG. 5 is a block diagram showing more of the details of the controller 72 depicted in FIG. 4 that includes a solids pluggage detection component 80 for early detection of solids pluggage in a fuel transport pipe 74 according to an embodiment of the invention. Aspects of the controller 72 including methods, processes, and operations performed thereby can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Further, the description that follows for the controller 72 in FIG. 5, as well as the description associated with other figures may use the terms "object," "module," "interface," "component," "system," "platform," "engine," "selector," "manager," "unit," "store," "network," "generator" and the like to refer to a computer-related entity or an entity related to, or that is part of, an operational machine or apparatus with a specific functionality. These entities can be either hardware, a combination of hardware and firmware, firmware, a combination of hardware and software, software, or software in execution. In addition, entities identified through the above terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts. The electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Referring again to FIG. 5, the controller 72 can include a data acquisition and preprocessing component 78, the solids pluggage detection component 80, an interface component 82, one or more processors 84, and memory 86 that may include Static or Dynamic Random Access Memory (RAM), Flash memory, rotating magnetic disk memory, Solid State Disks (SSDs), or optical storage such as Compact Disc (CD) or Digital Versatile Disk (DVD). Memory 86 stores data 88 that can include, but is not limited to, time history of sensor data, time history of processed sensor data, time history of feed data from the feeder 66 and the coal feed regulator 55, time history of detection of solids pluggage in fuel transport pipe, time history of data communicated between controller 72 and control unit 100, program executable code for controller 72, warnings, alerts or messages generated by the executable program(s) such as for example, pluggage detection warnings and recommendations, and configuration data used by the executable program(s) performing the above-described actions associated with the detection of pluggage in a fuel transport pipe based on information from one or more of at least one doppler radar-based mass flow sensor 57 and at least one solid particle velocity sensor 59 per one embodiment, and those with reference to the actions for that embodiment described with respect to FIG. 6.

In various embodiments, one or more of the data acquisition and preprocessing component 78, the solids pluggage detection component 80, the interface component 82, the one or more processors 84, and the memory 86 can be electrically and/or communicatively coupled to one another to perform one or more of the functions of the controller 72. In some embodiments, one or more of the data acquisition and preprocessing component 78, the solids pluggage detection component 80, and the interface component 82 can comprise software instructions stored on the memory 86 and executed by processor(s) 84. In addition, the controller 72 may interact with other hardware and/or software components not depicted in FIG. 5. For example, processor(s) 84 may interact with one or more external user interface devices, such as a keyboard, a mouse, a display monitor, a touchscreen, a printer, a network communication controller, removable storage devices such as a flash drive, communication multiplexors or data acquisition controllers, or other such interface devices.

The data acquisition and preprocessing component 78 can be configured to acquire the measurements obtained by the at least one doppler radar-based mass flow sensor 57 and the at least one solid particle velocity sensor 59, as well as the information provided by the feeder 66 and the coal feed regulator 55. In one embodiment, the data acquisition and preprocessing component 78 can include a plurality of analog to digital converters (A/D), with each A/D converter operatively coupled to the at least one doppler radar-based mass flow sensor 57, the at least one solid particle velocity sensor 59, the feeder 66 and the coal feed regulator 55. It is understood that the data acquisition and preprocessing component 78 can include other components, including, but not limited to, communication multiplexors or data acquisition controllers.

In another embodiment, some or all of the aforementioned sensors may communicate with the data acquisition and preprocessing component 78 via one or more digital communication interfaces including, but not limited, to communication networks and protocols such as Modbus/TCP or Modbus RTU, and wireless communication systems (e.g., WiFi, Bluetooth, or Zigbee, or analog electrical signals such as 4-20 ma current loops or 0V-to-10V electrical signals). In another embodiment, some or all of the sensors may communicate electrical signals to one or more separate Input/Output devices which can then communicate with the data acquisition and preprocessing component 78 via a digital communication interface including, but not limited to, Modbus/TCP or Modbus RTU. In another embodiment, some or all of the sensors may communicate with the plant control unit 100 which then can communicate the measurements via a digital communication interface including, but not limited, to Modbus/TCP, Modbus RTU, or OLE for Process Control (OPC). In this manner, the A/D converters can convert physical condition signals that are provided to the controller 72 by the sensors including, for example, the at least one doppler radar-based mass flow sensor 57, the at least one solid particle velocity sensor 59, the feeder 66 and the coal feed regulator 55 into digital form for further storage and analysis.

The data acquisition and preprocessing component 78 can further include a data preprocessor that is configured to eliminate the noise embedded in the signals obtained from the at least one doppler radar-based mass flow sensor 57, the at least one solid particle velocity sensor 59, the feeder 66 and the coal feed regulator 55, and extract key-feature related information from these elements. In general, the data preprocessing can include segmentation of the data received from the sensors, cleaning of the data, and extracting key-feature related information. In one embodiment, the data preprocessing can include time averaging of the data obtained from the at least one doppler radar-based mass flow sensor 57, the at least one solid particle velocity sensor 59, the feeder 66 and the coal feed regulator 55, averaging data from multiple parallel sensors, and counting numbers of measurement quality indications representing uncertain or low quality measurements. In this manner, the time-averaged pre-processed data can give representative data values that are indicative of the flow conditions of the solid particles of fuel in the gas transport stream that is flowing in the fuel transport pipe 54 while accounting for unsteady operation and noisy measurements. It is understood that other processing operations can be utilized. These other operations can include, but are not limited to, standard deviation or kurtosis, counting the percentage of velocity samples below some threshold, or other statistical processing can also be appropriate as described in the next paragraph. For example, a higher standard deviation might indicate how many particles are flowing both faster and slower than average due to turbulent flow.

In one embodiment, the data preprocessing can include performing other mathematical processing or statistical operations on the data in order to obtain an indication of the conditions in the fuel transport that are indicative of solids pluggage. These mathematical processing and statistical operations can include, but are not limited to, averaging, range checking of sensor values to exclude unrealistic values based on process conditions, using sensor status or measurement quality information to exclude sensor measurement values which are known to be bad or inaccurate, excluding sensor values which vary too much from the previous measurement in time and are therefore known to be in error, excluding one or more of a group of similar measurement values which vary too much from the median or average of the sensor values, or other forms of data preprocessing.

To this extent, a representation of the solids pluggage conditions can be obtained by performing any of these mathematical processing operations. For example, the at least one doppler radar-based mass flow sensor 57 may be influenced by an increase in turbulence in the gas transport stream and report a fuel flow value much higher than the expected fraction of the pulverizer fuel flow, for example significantly above one fourth or one eighth of the total pulverizer fuel flow in a T-fired boiler. In another example, the measurement quality reported by the at least one doppler radar-based mass flow sensor 57 and the at least one solid particle velocity sensor 59 may be bad if the sensors are unable to complete a measurement successfully. Any measurement values from the sensors when the corresponding measurement quality are bad may be excluded from the data set used for solids pluggage detection. In another example, the measurement data may be discarded if the controller 72 loses communication with a sensor or an I/O device.

With the data acquired and preprocessed by the data acquisition and preprocessing component 78, the solids pluggage detection component 80 can use this information to detect conditions in the gas transport stream carrying the solid particles in the transport pipe that are representative of pluggage of solid particles in the transport pipe as a function of information provided by one or more of the at least one doppler radar-based mass flow sensor and/or the at least one solid particle velocity sensor. The solids pluggage detection component 80 can utilize one or more of a solid particles pluggage detection algorithm and an empirical-based solid particles pluggage detection model to correlate the information provided by the at least one doppler radar-based mass flow sensor and/or the at least one particle velocity sensor. Below are further details of the solid particles pluggage detection as well as the correlation of the information obtained from the measurements of the at least one doppler radar-based mass flow sensor 57 and/or the at least one solid particle velocity sensor 59 to facilitate pluggage detection.

As noted above, the interface component 82 can convey the detection of solids pluggage in a fuel transport pipe 54 to the plant control unit 100 via the communications network component 74 (FIG. 3), however the interface component can be used to perform other functions. These functions include, but are not limited to, storing data such as time series sensor and calculation data or application program messages and alerts to memory 86 as part of the stored data 88. Interface component 82 may also communicate with other plant control, data communication and display, or data storage systems such as a plant data historian.

The one or more processors 84 can perform one or more of the functions described herein with reference to the operations associated with the data acquisition and preprocessing component 78, the solids pluggage detection component 80, and the interface component 82. The memory 86 can be a computer-readable storage medium that can store computer-executable instructions and/or information for performing the functions described herein with reference to the systems and/or methods disclosed that are associated with the data acquisition and preprocessing component 78, the solids pluggage detection component 80, and the interface component 82.

Figure 6:
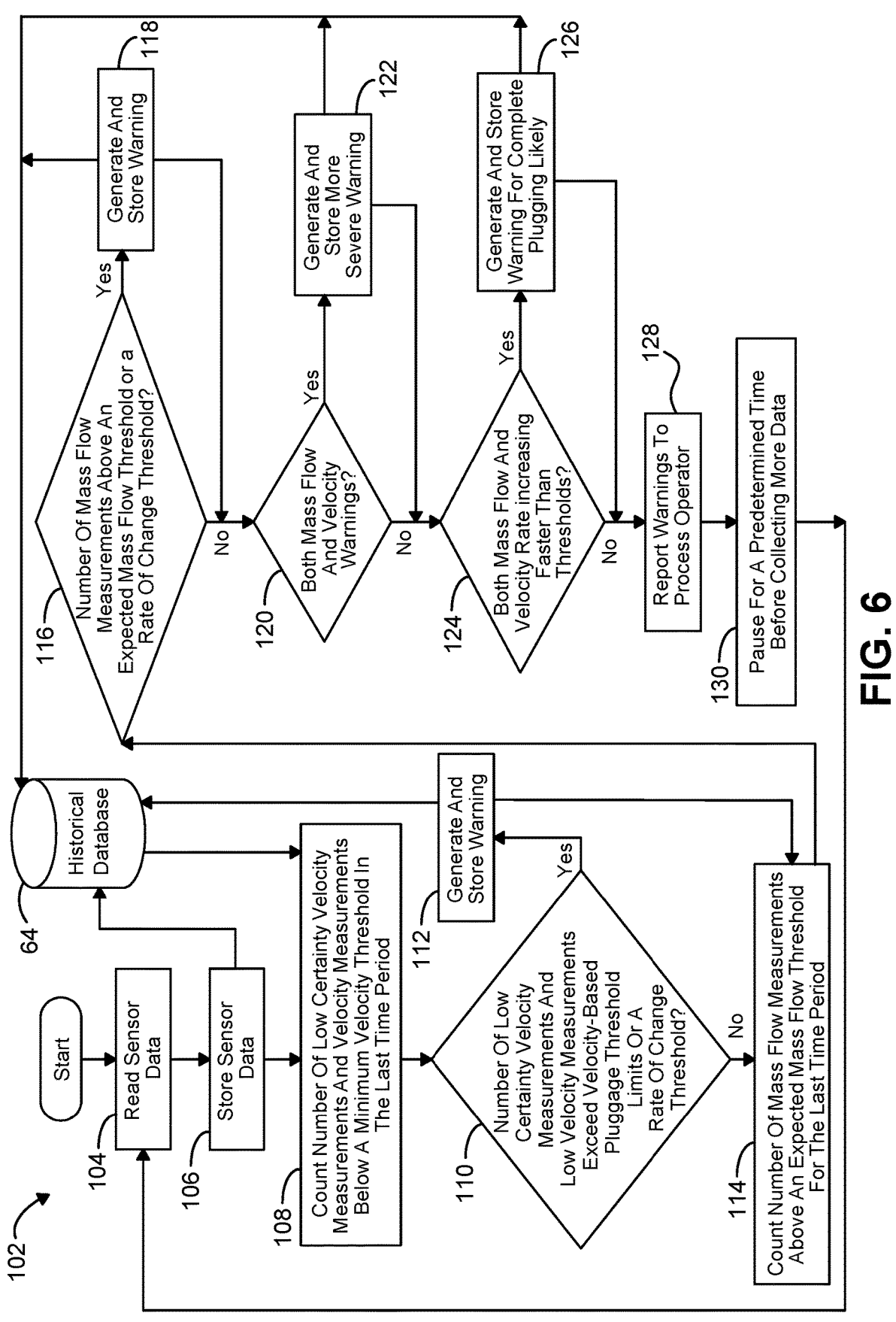
FIG. 6 is a flow chart describing a method for detecting early warning of pluggage of solid particles in a transport pipe according to an embodiment of the invention.

FIG. 6 is a flow chart 102 describing a method for detecting early warning of pluggage of solid particles of fuel in a fuel transport pipe 54 according to an embodiment of the invention. The method for detecting pluggage of solid particles of fuel in a fuel transport pipe 54 as described in the flow chart 102 of FIG. 6 can begin by reading the sensor data measurements obtained by the at least one doppler radar-based mass flow sensor 57 and the at least one solid particle velocity sensor 59 at 104. The sensor data can then be stored at 106 in a historical database 64 that contains a variety of data that can include, but not limited to, historical data obtained from the at least one doppler radar-based mass flow sensor 57 and the at least one solid particle velocity sensor 59, as well as data from any of the aforementioned sensors and components of the boiler 12, like for example, the feeder 66, the coal feed regulator 55, and the historical operating data of the boiler.

Processing block 108 in FIG. 6 relates to the correlation of the stored information obtained from the at least one solid particle velocity sensor 59 during the last time period that measurements were evaluated. In one embodiment, the correlation of the information from the at least one solid particle velocity sensor 59 can include evaluating the velocity measurements of the solid particles and the one or more qualitative indications for trends of changing behavior in the measurements. For example, with regard to evaluating the one or more qualitative indications for trends of changing behavior in the measurements, the correlation can include counting the number of instances in which the qualitative indications are suggestive of conditions corresponding to pluggage of solid particles in the fuel transport pipe 54. As noted above, the qualitative indications can include an indication of whether there is a linear flow of the pulverized solid particles of fuel in the fuel transport pipe 54 that is in a direction that corresponds with the flow path, an indication of whether the flow of the pulverized solid particles of fuel is in a reverse direction in relation to the flow path (e.g., a reading of −20 ft/sec can be indicative of flow in a reverse direction from the flow path as opposed to +20 ft/sec, or an express reverse flow direction statement noted with the velocity measurements), status information of the velocity measurements (e.g., whether a measurement was made or not made), a quality indicator denoting the quality of the velocity measurements (e.g. an indication of whether the measurement is of high quality or is of low quality), and a confidence indicator denoting a confidence level in the quality of the velocity measurements (e.g. an indication of whether there is high confidence in the measurement, or if there is low confidence or uncertainty with the measurement).

Depending on the information, these qualitative indications can be suggestive of conditions corresponding to pluggage of solid particles in the fuel transport pipe. For example, if the velocity measurements are not characterized by a linear flow or are flowing in a reverse direction in relation to the flow path, then these indications can be associated with conditions that are indicative of solid particles pluggage in the fuel transport pipe. Similarly, if the velocity measurements are deemed to be of uncertain quality, then these indications can also be suggestive of pluggage conditions. For example, if the one or more fuel particle velocity sensors 59 are displaying instances in which measurements were unable to be obtained (suggestive of no flow and thus pluggage), the measurements that were obtained are deemed of low certainty or quality, or there is low confidence with regard to the accuracy of the measurements, then these indications can also be associated with conditions that are indicative of solid particles pluggage in the fuel transport pipe.

With regard to the evaluating of the velocity measurements for trends in instances that the velocity measurements are below a predetermined minimum velocity threshold as noted in processing block 108 of FIG. 6, the correlation can include comparing the velocity measurements to the predetermined minimum velocity threshold. As noted above, a minimum gas stream velocity is needed to carry the solid particles of fuel in the fuel transport pipe 54 from the pulverizer 16 to the burners of the boiler 12. Those skilled in the art will appreciate that the minimum gas stream velocity can vary among combustion systems due to inherent variability in each of the systems. For purposes of illustration, consider that the minimum gas stream velocity in the fuel-fired boiler system 10 of FIG. 1 that should result in minimum particle velocities of 50 feet/sec to about 70 feet/sec (the gas velocity needed to create this particle velocity is expected to be higher than the particle velocity). If the measured velocities from the at least one solid particle velocity sensor 59 are less than a predetermined minimum velocity threshold in this range between about 50 feet/sec to about 70 feet/sec, then this can be an indication that the solid particles of fuel may not all be making it through the fuel transport pipe 54 to the burners.

After correlating the velocity measurements from the at least one fuel particle velocity sensor 59 including the qualitative indicators, an assessment can be made at 110 as to whether the measurements and the noted qualitative indicators during the last time period are indicative of solids pluggage in the fuel transport pipe. In one embodiment, the velocity measurements and the qualitative indicators are indicative of solids pluggage if corresponding threshold limits are exceeded. In one embodiment, the number of qualitative indications determined at 108 to be suggestive of pluggage conditions in the fuel transport pipe can be compared against a qualitative indicator velocity measurement threshold that is specified to delineate an amount of low certainty velocity measurements in a time period that are likely representative of pluggage in the pipe. Accordingly, if the count of low certainty velocity measurements ascertained from the qualitative indicators exceeds the qualitative indicator velocity measurement threshold, then that is indication of pluggage in the pipe.

In addition to evaluating whether the number of qualitative indications deemed of low certainty exceed a predetermined threshold, an evaluation is made to ascertain whether the number of instances that the velocity measurements failed to satisfy the predetermined minimum velocity threshold exceed another limit specified for this assessment. To this extent, if the count of velocity measurements that operate below a predetermined minimum velocity exceeds the threshold limit, then that is an indication some particles may be dropping out of the gas stream leading to plugging in the pipe.

If both of the threshold limits for the evaluation of the qualitative indications and velocity measurement exceed their corresponding limits, then this is deemed to be more suggestive or confirmatory of conditions in the fuel transport pipe during this last time period that are indicative of pluggage, blockage or obstruction in the pipe that necessitate generating a warning of solids pluggage detection at 112. As shown in FIG. 6, this warning can then be stored in the historical database 64.

It should be understood that the comparison of the number of qualitative indications deemed suggestive of current or future pluggage conditions and the number of instances that the measured velocities are lower than the predetermined minimum velocity threshold against corresponding threshold limits are representative of only one approach that can be used to assess the velocity measurements for conditions indicative of solid particles pluggage in the fuel transport pipe 54 and are not meant to be limiting. Those skilled in the art will appreciate that other approaches for assessing the velocity measurements are possible. For example, in one embodiment, as also mentioned in the decision block 110, the number of qualitative indications deemed suggestive of pluggage conditions and the number of instances that the measured velocities are lower than the predetermined minimum velocity threshold can be compared against a rate of change threshold specified for the velocity measurements in comparison to measurements obtained from previous prior time periods. In particular, the changes in the number of qualitative indications deemed suggestive of pluggage conditions and number of instances that the measured velocities are lower than the predetermined minimum velocity threshold are compared against the counts of these assessments for the previous prior time periods. In one embodiment, the rate of change threshold for the velocity measurements can be specified with a value that corresponds with changes or trends in these measurements that are indicative of solids pluggage in the fuel transport pipe. In this manner, if the number of qualitative indications determined at 108 that are deemed suggestive of pluggage conditions in the fuel transport pipe and the number of instances that the measured velocities are lower than the predetermined minimum velocity threshold in comparison to the counts at the previous time periods are changing at a rate that is increasing faster than the rate of change threshold, then conditions in the fuel transport pipe during this last time period are deemed to be indicative of pluggage, blockage or obstruction in the pipe. In this scenario, a warning of solids pluggage detection can then be generated at 112 and stored in the historical database 64.

Processing block 114 in FIG. 6 relates to the correlation of the stored information obtained from the at least one doppler radar-based mass flow sensor 57 during the last time period that measurements were evaluated. The correlation of the information from the at least one doppler radar-based mass flow sensor 57 can include comparing the stored measured values to an expected solid particles flow value derived from a flow of the solid particles moving into the pulverizer 16 (i.e., a predetermined expected flow threshold), and counting the number of times that these measurements are above the predetermined expected flow threshold for this time period. In one embodiment, the predetermined expected flow threshold is derived from the feed rate of the raw coal to the pulverizer 16 per information obtained from the feeder 66 and the coal feed regulator 55 (FIG. 1). The expected flow threshold can include some percentage of flow imbalance between multiple pipes leaving the pulverizer. For example a threshold of 120% of one quarter of the feeder flow (for four pipes) could be appropriate. Another option can include adding the particle flows from all four pipes together and comparing that to the feeder flow. If the sum of four pipe flows is significantly above the feeder flow, then this can indicate turbulence from partial pluggage. As noted above, it is understood that other process variables can be used to derive the expected flow such as for example, from the weight of the coal and from a chemical reaction of the coal.

For purposes of illustration of an embodiment based on the derivation of the expected flow from the feed rate of the coal, assume that the pulverizer 16 is supplying pulverized coal to a T-fired boiler, and that pulverized particles of coal are flowing to four corners of the boiler. With the information obtained from the feeder 66 and the coal feed regulator 55 regarding the supply of coal entering the pulverizer 16, then the flow of the coal particles can ideally be assumed to be distributed such that each corner receives 25% of the coal flow. However, the coal flows from the pulverizer 16 to the corners of the boiler will be different from this ideal amount because of factors that can include, but are not limited to, moisture content in the coal and random variability in the system that arises during the distribution of the coal to the corners of the boiler. As a result, in this example, the expected solid particles flow value derived from a flow of the solid particles moving into the pulverizer 16 can be characterized as 25% of the feeder flow plus or minus a certain amount (e.g., from 0% to 20%) to account for the variability in the distribution of the coal from the pulverizer to the burners. In this manner, if the measurements from the at least one doppler radar-based mass flow sensor 57 is above the predetermined expected mass flow threshold, then this is an indication that there is pluggage in the fuel transport pipe 54.

After counting the number of times that the mass flow measurements are above the predetermined expected mass flow threshold, then a decision can be made at 116 in the flow of chart of FIG. 6 as to whether these mass flow measurements obtained from the at least one doppler radar-based mass flow sensor 57 during the last time period are indicative of solids pluggage in the fuel transport pipe. In one embodiment, the number of times that the mass flow measurements are above the predetermined expected mass flow threshold can be compared against a predetermined mass flow based pluggage threshold. If the number of times that the mass flow measurements are above the predetermined expected mass flow are greater than the predetermined mass flow-based pluggage threshold, then conditions in the fuel transport pipe during this last time period are deemed to be indicative of pluggage, blockage or obstruction in the pipe. A warning of solids pluggage detection can then generated at 118 and stored in the historical database 64 as shown in FIG. 6.

It should be understood that the comparison of the number of times that the mass flow measurements are above the predetermined expected mass flow is representative of only one approach that can be used to assess the mass flow measurements for conditions indicative of solid particles pluggage in the fuel transport pipe 54 and are not meant to limiting. Those skilled in the art will appreciate that other approaches for assessing the mass flow measurements are possible. For example, in one embodiment, as also mentioned in the decision block 116, the number of times that the mass flow measurements are above the predetermined expected mass flow can be compared against a rate of change threshold specified for the mass flow measurements in comparison to measurements obtained from previous prior time periods. In particular, the changes in the number of times that the mass flow measurements are above the predetermined expected mass flow can be compared against the counts of these assessments for the previous prior time periods. In one embodiment, if there is a difference between the two that exceeds a rate of change threshold, then this can be representative of changes or trends in the measurements that are indicative of solids pluggage in the fuel transport pipe.

In this manner, if the number of times that the mass flow measurements are above the predetermined expected mass flow threshold are greater than the predetermined mass flow-based pluggage threshold determined at 116 in comparison to the counts at the previous time periods and are changing at a rate that is increasing faster than the rate of change threshold, then conditions in the fuel transport pipe during this last time period are deemed to be indicative of pluggage, blockage or obstruction in the pipe. A warning of solids pluggage detection can then be generated from this evaluation at 118 and stored in the historical database 64.

The warnings of solid pluggage in the fuel transport pipe 54 that are separately generated from the assessments of information from the measurements of the at least one doppler radar-based mass flow sensor 57 and the at least one solid particle velocity sensor 59 can be more compelling to a power plant operator if both of the warnings are cross-checked against one another. That is, if both the assessments of information from the measurements of the at least one doppler radar-based mass flow sensor 57 and the at least one solid particle velocity sensor 59 are indicative of pluggage as determined at 120, then a more severe warning can be generated at 122 and stored in the historical database 64.

The assessment of information from the measurements of both the at least one doppler radar-based mass flow sensor 57 and the at least one solid particle velocity sensor 59 can include a further evaluation of the measurements instead of solely relying on whether warnings were generated independently of one another to determine the extent of the pluggage (i.e., whether there is partial pluggage or complete pluggage). For example, assuming that the assessments of the velocity measurements and the mass flow measurements at 110 and 116 were based on a comparison against respective threshold limits, then the further evaluation of the measurements from the at least one doppler radar-based mass flow sensor 57 and the at least one solid particle velocity sensor 59 as indicated at 124 can include determining whether both the velocity measurements and the mass flow measurements are increasing at a greater rate in comparison to corresponding measurements obtained from previous prior corresponding measurements. In one embodiment, the evaluation at 124 can include evaluating rate of change of the measurements to measurements obtained from previous prior corresponding measurements as discussed above. In this embodiment, if both of the corresponding rate of change threshold limits are exceeded as determined at 124, then a warning is generated at 126 that is indicative of a likelihood that conditions in the fuel transport pipe 54 correspond with a scenario that complete pluggage of the pipe with solid particles of fuel is more likely in the future. In addition, as shown in FIG. 6, at this point in the flow chart 102, any warnings generated from the evaluation of the measurements from the at least one doppler radar-based mass flow sensor 57 and the at least one solid particle velocity sensor 59 at 112, 118, 122 and 126 can be reported to a plant process operator at 128.

The process operations can then pause for a predetermined time period before collecting more data from the at least one doppler radar-based mass flow sensor 57 and the at least one solid particle velocity sensor 59 as shown at 130. After pausing for the predetermined time period, more data from the at least one doppler radar-based mass flow sensor 57 and at least one the solid particle velocity sensor 59 can be collected, and process operations 104-130 can be repeated to assess the latest measurements from the sensors in a similar manner.

While, for purposes of simplicity of explanation, the operations shown in FIG. 6 are described as a series of acts. It is to be understood and appreciated that the subject innovation associated with FIG. 6 is not limited by the order of acts, as some acts may, in accordance therewith, occur in a different order, concurrently with other acts, be split in such a manner that portions of the displayed acts are split and performed at different time instances as two or more acts. Accordingly, modifications or variations of the acts depicted in FIG. 6 are possible. Further, those skilled in the art will understand and appreciate that a methodology or operations depicted in FIG. 6 could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Although the discussion with regard to FIG. 6 entails the use of both the doppler radar-based mass flow sensor(s) 57 and the particle velocity sensor(s) 59 to detect solids plug-gage in a fuel transport pipe, it is understood that the detection can also be based on only the doppler radar-based mass flow sensor(s) or only the particle velocity sensor(s). In these scenarios, the detection of solids pluggage in a fuel transport pipe based on information obtained from either the doppler radar-based mass flow sensor(s) or the particle velocity sensor(s) can be ascertained in the same manner discussed for each of these sensors as described with respect to the flow chart 102.

Figure 7:
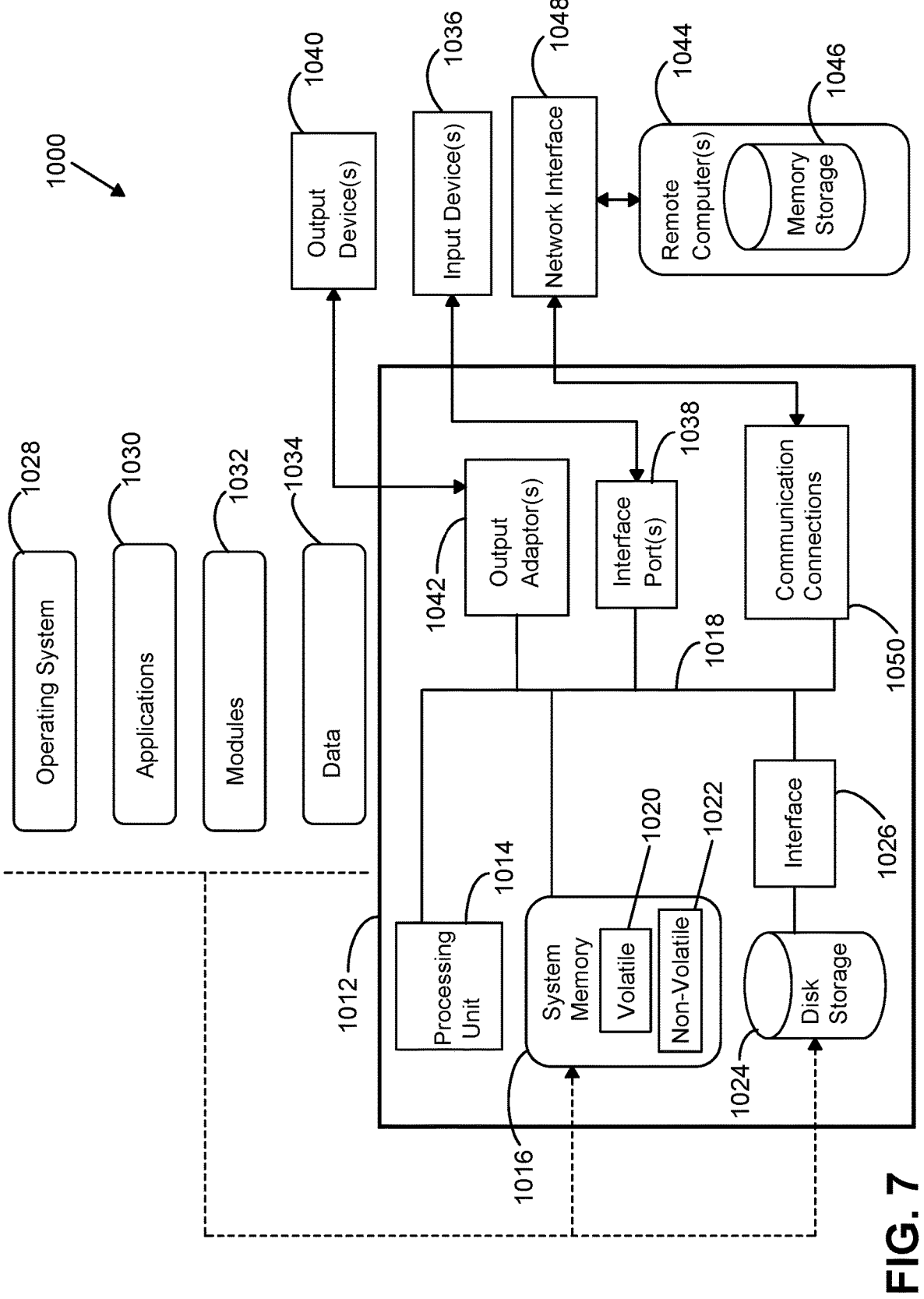
FIG. 7 is an example computing environment in which the various embodiments of the invention may be implemented.
Figure 8:
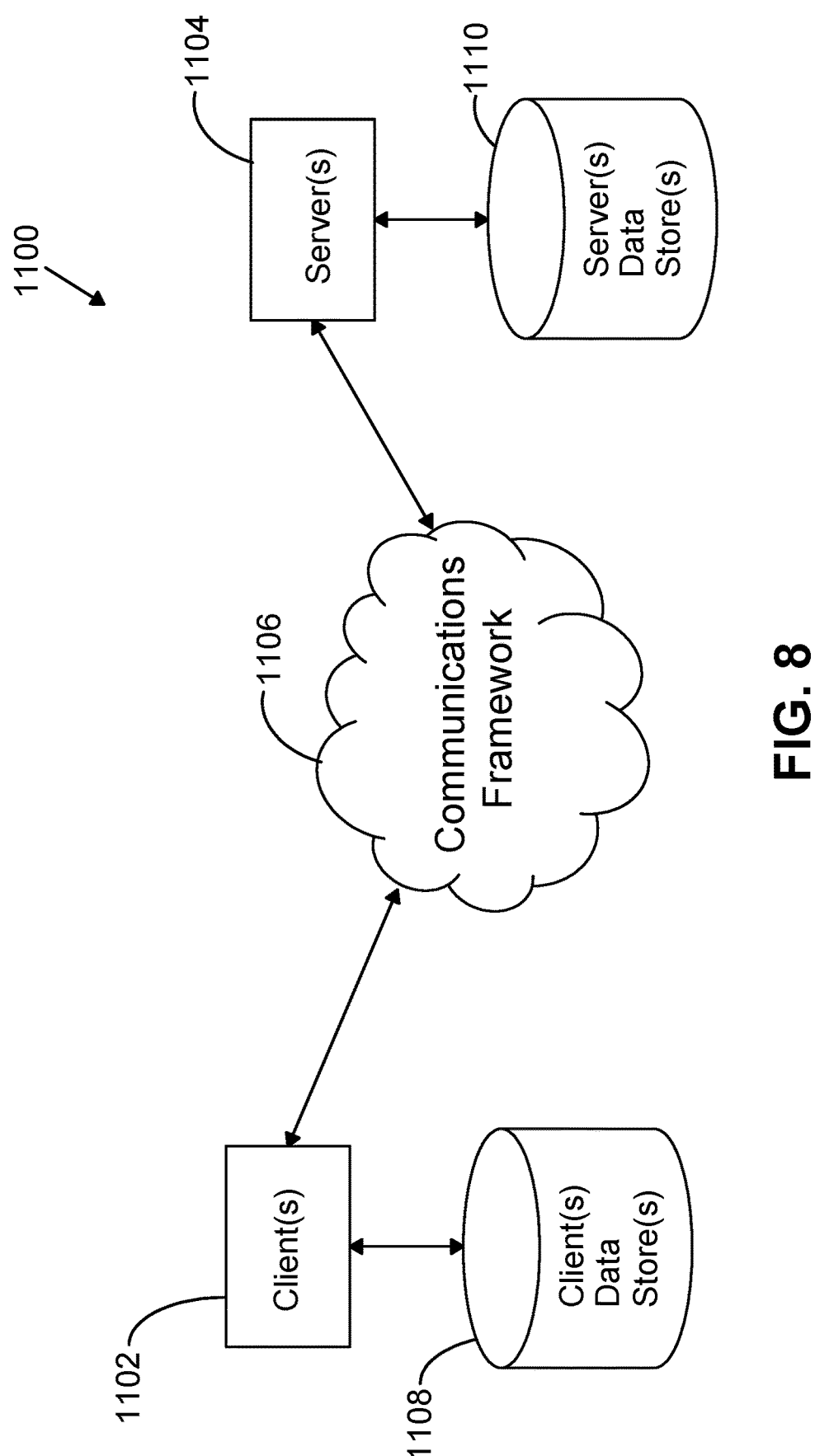
FIG. 8 is an example networking environment in which the various embodiments may be implemented.

In order to provide a context for the various aspects of the disclosed subject matter, FIGS. 7 and 8 as well as the following discussion are intended to provide a brief, general description of a suitable environment in which the various aspects of the disclosed subject matter may be implemented.

With reference to FIG. 7, an example environment 1000 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), Serial Advanced Technology Attachment (SATA), IEEE 1394 FireWire, VESA Local Bus (VLB), Peripheral Component Interconnect (PCI) and PCI Express, Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 7 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or USB memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 7 describes software that acts as an intermediary between users and the basic computer resources described in suitable operating environment 1000. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network firewall, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, wireless networks such as WiFi or Bluetooth, and Ethernet cards.

FIG. 8 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

From the foregoing description, it should be clear that the system and method for detecting early warning of solids pluggage in a transport pipe per the various embodiments has many technical effects and improvements that equate to technical distinctions over conventional approaches used to detect solids pluggage in a transport pipe that carries solid particles in a gas transport stream from a first location to a second location. For example, in a scenario directed to a combustion system that includes a pulverizer, a boiler, and a fuel transport pipe in a multi-parallel pipe configuration to transport solid particles of fuel from the pulverizer in a gas stream to burners disposed about the corners or walls of the boiler, an embodiment can use primary and secondary measurement information from two different types of sensors disposed about the fuel transport pipe and combine indications from one or more of the sensors to provide an early warning of potential solids pluggage in the transport pipe. The early warning of the potential solids pluggage in the transport pipe is more reliable than present approaches that utilize thermocouples or other temperature measuring sensors to detect fuel transport pipe fires which are often delinquent in noting pluggage until well after serious problems have arisen and it is too late to take corrective measures.

In certain embodiments, one of the sensors can include at least one doppler radar-based mass flow sensor that emits microwave signals towards the gas transport stream carrying the solid particles in the transport pipe and measures reflections from the solid particles, while the other sensor can include at least one particle velocity sensor such as for example, a triboelectric velocity sensor, and an image processing-based velocity sensor, including combinations thereof that can measure the velocity of the solid particles and provide one or more qualitative indications associated with the velocity measurements of the solid particles.

A controller is operative to detect conditions in the gas transport stream carrying the solid particles in the transport pipe that are representative of pluggage of solid particles in the transport pipe as a function of information provided by one or more of the at least one doppler radar-based mass flow sensor and the at least one solid particle velocity sensor. The controller can utilize one or more of a solid particles pluggage detection algorithm and an empirical-based solid particles pluggage detection model to correlate the information provided by the at least one doppler radar-based mass flow sensor and/or the at least one particle velocity sensor and determine whether there is pluggage in the fuel transport pipe due to solids pluggage.

The detection of pluggage in the fuel transport pipe can be based on information from either the at least one doppler radar-based mass flow sensor or the at least one solid particle velocity sensor, or from even both sensors. To this extent, a pluggage condition can be detected from the correlation of the information provided by the at least one doppler radar-based mass flow sensor of which a warning of the pluggage can be generated. Similarly, a pluggage condition can be detected from the correlation of the information provided by the at least one particle velocity sensor and used to generate a warning of the pluggage. The warnings that are based on either the doppler radar-based mass flow sensors or the particle velocity sensors can be indicative of a partial pluggage in the fuel transport pipe.

In one embodiment, the information from the at least one doppler radar-based mass flow sensor and the at least one solid particle velocity sensor can be cross-checked against one another to ascertain a degree of pluggage in the fuel transport pipe that could entail pluggage that is beyond partial pluggage that can be ascertained from individual confirmations of pluggage detections based on information from either the at least one doppler radar-based mass flow sensor and the at least one solid particle velocity sensor. For example, if the information from the doppler radar-based mass flow sensors and the solid particle velocity sensors both are indicative of pluggage conditions in the fuel transport pipe, then this can be interpreted as more of a likelihood that these conditions will lead to complete pluggage of solid particles in the pipe. To this extent, a more severe warning can be generated to apprise a plant operator of the severity of the pluggage in the fuel transport pipe. As noted above, instead of using both the doppler radar-based mass flow sensor(s) and the particle velocity sensor(s) to detect solids pluggage in a fuel transport pipe, other embodiments can be based on only the doppler radar-based mass flow sensor(s) or only the particle velocity sensor(s).

By having early detection of pluggage of solid particles in the fuel transport pipe as provided by the various embodiments, a number of corrective or direct actions can be taken. For example, in the embodiment that pertains to a combustion system that supplies pulverized solid particles of fuel in a gas transport stream from a solid fuel feed source to a boiler for combustion via a fuel transport pipe, power plant operators can take early actions to avoid a larger problem including making recommendations and taking direct action to address the pluggage. In particular, the velocity of the transport gas may be increased until solid particles of fuel no longer fall out of the transport gas stream. Alternatively, the pulverizer operation may be adjusted to create smaller particles that are more easily transported by the gas stream. This may prevent additional particles from falling out of the gas stream, but would not help pick up particles that have already fallen out as described below.

By using any of the above corrective actions, maintenance may then be deferred until a more convenient time, or maintenance may not be necessary as higher transport gas velocities may allow the transport gas stream to pick up solid particles of fuel that have fallen into the fuel transport pipe and transport them to the burners. Further, early warning of flammable particles collecting in the fuel transport pipe that form the basis of the solid pluggage detection can be used to prevent those flammable particles from catching fire. For example, if process changes are insufficient to stop particles from falling out of their transport gas stream, then a power plant operator can plan for an orderly process shutdown of the boiler to clear the fallen fuel particles and resolve any other process or equipment issues that caused the original problem. By taking any of these actions, it is quite possible that the plant operator can avoid major problems including, but not limited to, the occurrence of a fire, enduring significant economic ramifications associated with the occurrence of a fire due to lost days and weeks of production and capacity at millions of dollars a day if the boiler has to undergo a shutdown, buying replacement power if it becomes necessary, and the costs associated with performing maintenance to repair damage in the boiler that may arise from the fire.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Further, an element or step recited in the singular and proceeded with the word "a" or "an" should be understood as not excluding plural of the elements or steps, unless such exclusion is explicitly stated. In addition, the phrase "one or more of" used before a listing of a number of possible options or recitations is intended to mean any of the natural inclusive permutations. For example, "one or more of A and B" is satisfied by only A, only B, or both A and B.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system, comprising: a solid particles feed source; a solid particles processing location; a transport pipe to transport a supply of the solid particles from the solid particles feed source in a gas transport stream to the solid particles processing location; at least one doppler radar-based mass flow sensor operatively coupled to the transport pipe to emit microwave signals towards the gas transport stream carrying the solid particles in the transport pipe and measure reflections of the microwave signals from the solid particles in the gas transport stream, the measured reflections including reflections from the solid particles and turbulence in the gas transport stream, wherein the measured reflections from the solid particles and the turbulence in the gas transport stream provide an indication of the flow of the solid particles in the transport pipe; and a controller operative to detect conditions in the gas transport stream carrying the solid particles in the transport pipe that are representative of pluggage of solid particles in the transport pipe as a function of information provided by the at least one doppler radar-based mass flow sensor, wherein the controller is configured to correlate the information provided by the at least one doppler radar-based mass flow sensor with conditions that are indicative of pluggage in the transport pipe based on solid particles that have fallen out of the gas transport stream and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

The system of the preceding clause, further comprising at least one solid particle velocity sensor operatively coupled to the transport pipe to obtain velocity measurements of the solid particles and provide one or more qualitative indications associated with the velocity measurements of the solid particles.

The system of any of the preceding clauses, wherein the controller is operative to detect conditions in the gas transport stream carrying the solid particles in the transport pipe that are representative of pluggage of solid particles in the transport pipe as a function of information provided by the at least one solid particle velocity sensor, wherein the controller is configured to correlate the information provided by the at least one solid particle velocity sensor with conditions that are indicative of pluggage in the transport pipe based on solid particles that have fallen out of the gas transport stream and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

The system of any of the preceding clauses, wherein the controller is operative to detect conditions in the gas transport stream carrying the solid particles in the transport pipe that are representative of pluggage of solid particles in the transport pipe as a function of information provided by one or more of the at least one doppler radar-based mass flow sensor and the at least one solid particle velocity sensor.

The system of any of the preceding clauses, wherein the one or more qualitative indications provided by the at least one solid particle velocity sensor is selected from the group consisting of an indication of whether there is a linear flow of the solid particles in the gas transport stream in the transport pipe that is in a direction that corresponds with a flow path that carries the supply of the solid particles in the gas transport stream from the solid particles feed source to the solid particles processing location, an indication of whether there is a flow of the solid particles in the gas transport stream in the transport pipe that is in a reverse direction to the flow path based on an interpretation of the velocity measurements or an express reverse flow direction statement noted with the velocity measurements, status information of the velocity measurements of the solid particles in the gas transport stream, the status information including a quality indicator denoting the quality of the velocity measurements, a direction of the flow of the particles in the velocity measurements, a confidence indicator denoting a confidence level in the quality of the velocity measurements, and combinations thereof.

The system of any of the preceding clauses, wherein the expected solid particles flow value is derived from one or more of an expected flow of solid particles entering through the solid particles feed source, a change in weight of the solid particles from the weight of the solid particles entering into the solid particles feed source, a change in a chemical reaction rate of the solid particles at the solid particles processing location from the chemical reaction rate of the solid particles entering into the solid particles feed source, and production output obtained from the solid particles processing location.

The system of any of the preceding clauses, wherein the controller comprises one or more of a solid particles pluggage detection algorithm and an empirical-based solid particles pluggage detection model to correlate the information provided by the at least one doppler radar-based mass flow sensor and the at least one solid particle velocity sensor with conditions that are indicative of pluggage in the transport pipe.

The system of any of the preceding clauses, wherein the solid particles pluggage detection algorithm utilizes statistical measures of variation in the information provided by the at least one doppler radar-based mass flow sensor and the at least one particle velocity sensor in the correlation to identify whether the information equates to pluggage of the solid particles in the transport pipe.

A method for detecting pluggage in a transport pipe that supplies solid particles in a gas transport stream from a solid particles feed source to a solid particles processing location, the method comprising: emitting microwave signals toward the gas transport stream carrying the solid particles in the transport pipe with at least one doppler radar-based mass flow sensor; measuring reflections of the microwave signals from the solid particles in the gas transport stream with the at least one doppler radar-based mass flow sensor, the measured reflections including reflections from the solid particles and turbulence in the gas transport stream, wherein the measured reflections from the solid particles and the turbulence in the gas transport stream provide an indication of the flow of the solid particles in the transport pipe; and detecting conditions in the gas transport stream carrying the solid particles in the transport pipe that are representative of pluggage of solid particles in the transport pipe as a function of information provided by the at least one doppler radar-based mass flow sensor, wherein the detecting comprises correlating the information provided by the at least one doppler radar-based mass flow sensor with conditions that are indicative of pluggage in the transport pipe based on solid particles that have fallen out of the gas transport stream carrying the particles and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

The method of the preceding clause, further comprising: obtaining velocity measurements of the solid particles with at least one solid particle velocity sensor; providing one or more qualitative indications associated with the velocity measurements of the solid particles from the at least one solid particle velocity sensor; and detecting conditions in the gas transport stream carrying the solid particles in the transport pipe that are representative of pluggage of solid particles in the transport pipe as a function of information provided by the at least one solid particle velocity sensor, wherein the detecting comprises correlating the information provided by the at least one solid particle velocity sensor with conditions that are indicative of pluggage in the transport pipe based on solid particles that have fallen out of the gas transport stream carrying the particles and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

The method of any of the preceding clauses, wherein the detecting of conditions in the gas transport stream carrying the solid particles in the transport pipe that are representative of pluggage of solid particles in the transport pipe is performed as a function of information provided by one or more of the at least one doppler radar-based mass flow sensor and the at least one solid particle velocity sensor.

The method of any of the preceding clauses, further comprising determining a likelihood of probability that the detected conditions associated with the pluggage of solid particles in the transport pipe will escalate towards complete pluggage.

The method of any of the preceding clauses, further comprising recommending at least one corrective action in response to detecting pluggage of solid particles in the transport pipe.

The method of any of the preceding clauses, wherein the at least one corrective action is selected from the group consisting of increasing the velocity of the solid particles that is supplied from the solid particles feed source to the solid particles processing location by the transport pipe in order for the solid particles to have a linear flow in a direction to pick up solid particles that have fallen out of a flow path for supply of the gas transport stream with solid particles from the solid particles feed source to the solid particles processing location and redirect the fallen out solid particles back into the flow path for supply to the solid particles processing location, facilitating a controlled maintenance shutdown of the solid particles feed source and the solid particles processing location to remove the fallen out solid particles from the transport pipe, and taking action to decrease the particle size so that all solid particles are successfully carried in the gas transport stream.

The method of any of the preceding clauses, further comprising taking direct actions to address pluggage in the transport pipe in response to detection of the pluggage of solid particles in the transport pipe.

A system, comprising: a solid particles feed source; a solid particles processing location; a transport pipe to transport a supply of the solid particles from the solid particles feed source in a gas transport stream to the solid particles processing location; at least one solid particle velocity sensor operatively coupled to the transport pipe to obtain velocity measurements of the solid particles and provide one or more qualitative indications associated with the velocity measurements of the solid particles, and a controller operative to detect conditions in the gas transport stream carrying the solid particles in the transport pipe that are representative of pluggage of solid particles in the transport pipe as a function of information provided by the at least one solid particle velocity sensor, wherein the controller is configured to correlate the information provided by the at least one solid particle velocity sensor with conditions that are indicative of pluggage in the transport pipe based on solid particles that have fallen out of the gas transport stream and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

The system of the preceding clause, further comprising at least one doppler radar-based mass flow sensor operatively coupled to the transport pipe to emit microwave signals towards the gas transport stream carrying the solid particles in the transport pipe and measure reflections of the microwave signals from the solid particles in the gas transport stream, the measured reflections including reflections from the solid particles and turbulence in the gas transport stream, wherein the measured reflections from the solid particles and the turbulence in the gas transport stream provide an indication of the flow of the solid particles in the transport pipe.

The system of any of the preceding clauses, wherein the controller is configured to correlate the information provided by the at least one doppler radar-based mass flow sensor with conditions that are indicative of pluggage in the transport pipe based on solid particles that have fallen out of the gas transport stream and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

The system of any of the preceding clauses, wherein the controller is operative to detect conditions in the gas transport stream carrying the solid particles in the transport pipe that are representative of pluggage of solid particles in the transport pipe as a function of information provided by one or more of the at least one doppler radar-based mass flow sensor and the at least one solid particle velocity sensor.

The system of any of the preceding clauses, wherein the one or more qualitative indications provided by the at least one solid particle velocity sensor is selected from the group consisting of an indication of whether there is a linear flow of the solid particles in the gas transport stream in the transport pipe that is in a direction that corresponds with a flow path that carries the supply of the solid particles in the gas transport stream from the solid particles feed source to the solid particles processing location, an indication of whether there is a flow of the solid particles in the gas transport stream in the transport pipe that is in a reverse direction to the flow path based on an interpretation of the velocity measurements or an express reverse flow direction statement noted with the velocity measurements, status information of the velocity measurements of the solid particles in the gas transport stream, the status information including a quality indicator denoting the quality of the velocity measurements, a direction of the flow of the particles in the velocity measurements, a confidence indicator denoting a confidence level in the quality of the velocity measurements, and combinations thereof.

What is claimed is:

1. A system, comprising:

a solid particles feed source;

a solid particles processing location;

a transport pipe to transport a supply of the solid particles from the solid particles feed source in a gas transport stream to the solid particles processing location;

at least one doppler radar-based mass flow sensor operatively coupled to the transport pipe to emit microwave signals towards the gas transport stream carrying the solid particles in the transport pipe and measure reflections of the microwave signals from the solid particles in the gas transport stream, the measured reflections including reflections from the solid particles and turbulence in the gas transport stream, wherein the measured reflections from the solid particles and the turbulence in the gas transport stream provide an indication of the flow of the solid particles in the transport pipe; and a controller operative to detect conditions in the gas transport stream carrying the solid particles in the transport pipe that are representative of pluggage of solid particles in the transport pipe as a function of information provided by the at least one doppler radar-based mass flow sensor, wherein the controller is configured to correlate the information provided by the at least one doppler radar-based mass flow sensor with conditions that are indicative of pluggage in the transport pipe based on solid particles that have fallen out of the gas transport stream and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

2. The system of claim 1, further comprising at least one solid particle velocity sensor operatively coupled to the transport pipe to obtain velocity measurements of the solid particles and provide one or more qualitative indications associated with the velocity measurements of the solid particles.

3. The system of claim 2, wherein the controller is operative to detect conditions in the gas transport stream carrying the solid particles in the transport pipe that are representative of pluggage of solid particles in the transport pipe as a function of information provided by the at least one solid particle velocity sensor, wherein the controller is configured to correlate the information provided by the at least one solid particle velocity sensor with conditions that are indicative of pluggage in the transport pipe based on solid particles that have fallen out of the gas transport stream and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

4. The system of claim 3, wherein the controller is operative to detect conditions in the gas transport stream carrying the solid particles in the transport pipe that are representative of pluggage of solid particles in the transport pipe as a function of information provided by one or more of the at least one doppler radar-based mass flow sensor and the at least one solid particle velocity sensor.

5. The system of claim 2, wherein the one or more qualitative indications provided by the at least one solid particle velocity sensor is selected from the group consisting of an indication of whether there is a linear flow of the solid particles in the gas transport stream in the transport pipe that is in a direction that corresponds with a flow path that carries the supply of the solid particles in the gas transport stream from the solid particles feed source to the solid particles processing location, an indication of whether there is a flow of the solid particles in the gas transport stream in the transport pipe that is in a reverse direction to the flow path based on an interpretation of the velocity measurements or an express reverse flow direction statement noted with the velocity measurements, status information of the velocity measurements of the solid particles in the gas transport stream, the status information including a quality indicator denoting the quality of the velocity measurements, a direction of the flow of the particles in the velocity measurements, a confidence indicator denoting a confidence level in the quality of the velocity measurements, and combinations thereof.

6. The system of claim 1, wherein the expected solid particles flow value is derived from one or more of an expected flow of solid particles entering through the solid particles feed source, a change in weight of the solid particles from the weight of the solid particles entering into the solid particles feed source, a change in a chemical reaction rate of the solid particles at the solid particles processing location from the chemical reaction rate of the solid particles entering into the solid particles feed source, and production output obtained from the solid particles processing location.

7. The system of claim 4, wherein the controller comprises one or more of a solid particles pluggage detection algorithm and an empirical-based solid particles pluggage detection model to correlate the information provided by the at least one doppler radar-based mass flow sensor and the at least one solid particle velocity sensor with conditions that are indicative of pluggage in the transport pipe.

8. The system of claim 7, wherein the solid particles pluggage detection algorithm utilizes statistical measures of variation in the information provided by the at least one doppler radar-based mass flow sensor and the at least one particle velocity sensor in the correlation to identify whether the information equates to pluggage of the solid particles in the transport pipe.

9. A method for detecting pluggage in a transport pipe that supplies solid particles in a gas transport stream from a solid particles feed source to a solid particles processing location, the method comprising:

emitting microwave signals toward the gas transport stream carrying the solid particles in the transport pipe with at least one doppler radar-based mass flow sensor;

measuring reflections of the microwave signals from the solid particles in the gas transport stream with the at least one doppler radar-based mass flow sensor, the measured reflections including reflections from the solid particles and turbulence in the gas transport stream, wherein the measured reflections from the solid particles and the turbulence in the gas transport stream provide an indication of the flow of the solid particles in the transport pipe; and detecting conditions in the gas transport stream carrying the solid particles in the transport pipe that are representative of pluggage of solid particles in the transport pipe as a function of information provided by the at least one doppler radar-based mass flow sensor, wherein the detecting comprises correlating the information provided by the at least one doppler radar-based mass flow sensor with conditions that are indicative of pluggage in the transport pipe based on solid particles that have fallen out of the gas transport stream carrying the particles and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

10. The method of claim 9, further comprising:

obtaining velocity measurements of the solid particles with at least one solid particle velocity sensor;

providing one or more qualitative indications associated with the velocity measurements of the solid particles from the at least one solid particle velocity sensor; and detecting conditions in the gas transport stream carrying the solid particles in the transport pipe that are representative of pluggage of solid particles in the transport pipe as a function of information provided by the at least one solid particle velocity sensor, wherein the detecting comprises correlating the information provided by the at least one solid particle velocity sensor with conditions that are indicative of pluggage in the transport pipe based on solid particles that have fallen out of the gas transport stream carrying the particles and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

11. The method of claim 10, wherein the detecting of conditions in the gas transport stream carrying the solid particles in the transport pipe that are representative of pluggage of solid particles in the transport pipe is performed as a function of information provided by one or more of the at least one doppler radar-based mass flow sensor and the at least one solid particle velocity sensor.

12. The method of claim 9, further comprising determining a likelihood of probability that the detected conditions associated with the pluggage of solid particles in the transport pipe will escalate towards complete pluggage.

13. The method of claim 9, further comprising recommending at least one corrective action in response to detecting pluggage of solid particles in the transport pipe.

14. The method of claim 13, wherein the at least one corrective action is selected from the group consisting of increasing the velocity of the solid particles that is supplied from the solid particles feed source to the solid particles processing location by the transport pipe in order for the solid particles to have a linear flow in a direction to pick up solid particles that have fallen out of a flow path for supply of the gas transport stream with solid particles from the solid particles feed source to the solid particles processing location and redirect the fallen out solid particles back into the flow path for supply to the solid particles processing location, facilitating a controlled maintenance shutdown of the solid particles feed source and the solid particles processing location to remove the fallen out solid particles from the transport pipe, and taking action to decrease the particle size so that all solid particles are successfully carried in the gas transport stream.

15. The method of claim 9, further comprising taking direct actions to address pluggage in the transport pipe in response to detection of the pluggage of solid particles in the transport pipe.

16. A system, comprising:

a solid particles feed source;

a solid particles processing location;

a transport pipe to transport a supply of the solid particles from the solid particles feed source in a gas transport stream to the solid particles processing location;

at least one solid particle velocity sensor operatively coupled to the transport pipe to obtain velocity measurements of the solid particles and provide one or more qualitative indications associated with the velocity measurements of the solid particles, and a controller operative to detect conditions in the gas transport stream carrying the solid particles in the transport pipe that are representative of pluggage of solid particles in the transport pipe as a function of information provided by the at least one solid particle velocity sensor, wherein the controller is configured to correlate the information provided by the at least one solid particle velocity sensor with conditions that are indicative of pluggage in the transport pipe based on solid particles that have fallen out of the gas transport stream and accumulated in the transport pipe, wherein the correlation of the information from the at least one solid particle velocity sensor includes evaluating the velocity measurements of the solid particles and the one or more qualitative indications for trends in instances that the velocity measurements are below a predetermined minimum velocity threshold and trends in instances that the one or more qualitative indications are suggestive of conditions corresponding to pluggage of solid particles in the transport pipe.

17. The system of claim 16, further comprising at least one doppler radar-based mass flow sensor operatively coupled to the transport pipe to emit microwave signals towards the gas transport stream carrying the solid particles in the transport pipe and measure reflections of the microwave signals from the solid particles in the gas transport stream, the measured reflections including reflections from the solid particles and turbulence in the gas transport stream, wherein the measured reflections from the solid particles and the turbulence in the gas transport stream provide an indication of the flow of the solid particles in the transport pipe.

18. The system of claim 17, wherein the controller is configured to correlate the information provided by the at least one doppler radar-based mass flow sensor with conditions that are indicative of pluggage in the transport pipe based on solid particles that have fallen out of the gas transport stream and accumulated in the transport pipe, wherein the correlation of the information from the at least one doppler radar-based mass flow sensor includes comparing the measured reflections to an expected solid particles flow value, the comparison of the measured reflections to the expected solid particles flow value providing an understanding of the measured reflections that are attributable to the reflections from the solid particles in the gas transport stream as opposed to the reflections from the turbulence in the gas transport stream.

19. The system of claim 17, wherein the controller is operative to detect conditions in the gas transport stream carrying the solid particles in the transport pipe that are representative of pluggage of solid particles in the transport pipe as a function of information provided by one or more of the at least one doppler radar-based mass flow sensor and the at least one solid particle velocity sensor.

20. The system of claim 16, wherein the one or more qualitative indications provided by the at least one solid particle velocity sensor is selected from the group consisting of an indication of whether there is a linear flow of the solid particles in the gas transport stream in the transport pipe that is in a direction that corresponds with a flow path that carries the supply of the solid particles in the gas transport stream from the solid particles feed source to the solid particles processing location, an indication of whether there is a flow of the solid particles in the gas transport stream in the transport pipe that is in a reverse direction to the flow path based on an interpretation of the velocity measurements or an express reverse flow direction statement noted with the velocity measurements, status information of the velocity measurements of the solid particles in the gas transport stream, the status information including a quality indicator denoting the quality of the velocity measurements, a direction of the flow of the particles in the velocity measurements, a confidence indicator denoting a confidence level in the quality of the velocity measurements, and combinations thereof.

* * * * *